United States Patent
Ko et al.

(10) Patent No.: US 9,949,064 B2
(45) Date of Patent: Apr. 17, 2018

(54) ELECTRONIC DEVICE AND OPERATING METHOD THEREOF

(71) Applicant: SAMSUNG ELECTRONICS CO., LTD., Suwon-si, Gyeonggi-do (KR)

(72) Inventors: Jae-Hun Ko, Seoul (KR); Tae-Wan Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/393,569

(22) Filed: Dec. 29, 2016

(65) Prior Publication Data

US 2017/0195830 A1 Jul. 6, 2017

(30) Foreign Application Priority Data

Dec. 30, 2015 (KR) .................... 10-2015-0190358

(51) Int. Cl.
*H04W 4/00* (2018.01)
*H04W 68/00* (2009.01)
*H04M 11/00* (2006.01)

(52) U.S. Cl.
CPC ......... *H04W 4/008* (2013.01); *H04M 11/007* (2013.01); *H04W 68/005* (2013.01); *H04M 2250/16* (2013.01); *H04M 2250/22* (2013.01); *H04M 2250/52* (2013.01)

(58) Field of Classification Search
CPC . H04W 4/008; H04W 68/005; H04M 11/007; H04M 2250/22; H04M 2250/16; H04M 2250/52

USPC ........................................................ 455/41.2
See application file for complete search history.

(56) References Cited

U.S. PATENT DOCUMENTS

| | | | | |
|---|---|---|---|---|
| 9,118,750 | B2 * | 8/2015 | Vossoughi | .............. B60R 11/02 |
| 9,195,219 | B2 * | 11/2015 | Hong | ..................... G04G 21/00 |
| 9,325,817 | B2 * | 4/2016 | Vossoughi | .............. B60R 11/02 |

(Continued)

FOREIGN PATENT DOCUMENTS

| | | |
|---|---|---|
| KR | 10-2010-0120143 | 11/2010 |
| KR | 10-2015-0033902 | 4/2015 |
| KR | 10-2015-0064955 | 6/2015 |

*Primary Examiner* — Hai V Nguyen
(74) *Attorney, Agent, or Firm* — Nixon & Vanderhye P.C.

(57) ABSTRACT

An electronic device, according to various example embodiments of the present disclosure, may include: a housing; a display disposed to be exposed through one surface of the housing; at least one fastener formed on at least one surface of the housing and configured to be attached to, and detached from, an external electronic device; a communication circuit disposed inside the housing and configured to establish a communication connection with the external electronic device; and a processor disposed inside the housing, wherein the processor is configured to: determine whether the electronic device is connected with the external electronic device through the communication circuit; determine the type of the connected external electronic device when the electronic device is connected with the external electronic device; display, on the display, at least one preset function corresponding to the determined type of the external electronic device among a plurality of functions of the electronic device; and provide a function selected from the at least one function displayed on the display.

20 Claims, 18 Drawing Sheets

(56) References Cited

U.S. PATENT DOCUMENTS

| | | | |
|---|---|---|---|
| 2015/0085621 A1* | 3/2015 | Hong | G04G 21/00 368/10 |
| 2015/0156898 A1* | 6/2015 | Shin | H04M 1/0256 361/679.02 |
| 2015/0358440 A1* | 12/2015 | Vossoughi | B60R 11/02 455/566 |
| 2016/0241688 A1* | 8/2016 | Vossoughi | B60R 11/02 |

* cited by examiner

ELECTRONIC DEVICE AND OPERATING METHOD THEREOF

CROSS-REFERENCE TO RELATED APPLICATION

This application is based on and claims priority under 35 U.S.C. § 119 to Korean Application Serial No. 10-2015-0190358, which was filed in the Korean Intellectual Property Office on Dec. 30, 2015, the content of which is incorporated by reference herein in its entirety.

TECHNICAL FIELD

The present disclosure relates generally to an electronic device and, for example, to an electronic device capable of being attached to, and detached from, an external electronic device to provide various functions and an operating method thereof.

BACKGROUND

In recent years, screens of portable devices, such as smart phones, have become larger. As the screens of the portable devices have increased in size, it has become more and more difficult to control the portable devices with one hand while stably holding the same, which results in a degradation in convenience of use. Furthermore, wearable devices (e.g., smart watches, smart pendants, etc.) that are used in conjunction with portable devices have rapidly propagated. Recently, wearable devices have increasingly attracted a lot of attention since they can be worn on a part (e.g., wrist or neck) of a human body with ease. However, the wearable devices have failed to provide users with benefits other than the usability that they can be worn on a part of a human body, which leads to a gradual decrease in the usability.

SUMMARY

Accordingly, a new function is being required for enabling a user to control a portable device having a large screen (e.g., five inches or more) with one hand while stably holding the same and for providing various user benefits through a wearable device that operates in conjunction with the portable device.

To this end, various example embodiments of the present disclosure may provide an electronic device and an operating method thereof, in which a wearable device is detachably provided on a portable device (such as a smart phone), instead of being worn on a part of a user's body, to provide a new function that is not previously provided by the portable device when the wearable device is mounted on, or connected to, the portable device, thereby expanding various functions for the portable device.

According to various example embodiments of the present disclosure, an electronic device may include: a housing; at least one fastening member formed on at least one surface of the housing and configured to be attached to, and detached from, an external electronic device; a communication circuit disposed inside the housing and configured to establish a communication connection with the external electronic device; and a processor disposed inside the housing, and the processor may be configured to: determine whether the electronic device is connected with the external electronic device through the communication circuit; determine a type of the connected external electronic device when the electronic device is connected with the external electronic device; display, on the display of the electronic device, at least one preset function corresponding to the determined type of the external electronic device among a plurality of functions of the electronic device; and provide a function selected from the at least one function displayed on the display.

According to various example embodiments of the present disclosure, a method for operating an electronic device may include: determining whether the electronic device is connected with an external electronic device; determining the type of the connected external electronic device when the electronic device is connected with the external electronic device; displaying, on a display of the electronic device, at least one preset function corresponding to the determined type of the external electronic device among a plurality of functions of the electronic device; and providing a function selected from the at least one function displayed on the display.

According to various example embodiments of the present disclosure, an electronic device may include: a housing: at least one fastening member formed on at least one surface of the housing and configured to be attached to, and detached from, an external electronic device; a communication circuit disposed inside the housing and configured to establish a communication connection with the external electronic device; and a processor disposed inside the housing, and the processor may be configured to: determine whether the electronic device is connected with the external electronic device through the communication circuit; and provide at least one preset function corresponding to the type of the electronic device among a plurality of functions of the connected external electronic device when the electronic device is connected with the external electronic device.

According to the various example embodiments of the present disclosure, the electronic device is detachably provided on the external electronic device to provide a new function that is not previously provided by the external electronic device when the electronic device is mounted on the external electronic device, thereby expanding the function of the external electronic device.

BRIEF DESCRIPTION OF THE DRAWINGS

The above and other aspects, features, and attendant advantages of the present disclosure will be more apparent from the following detailed description, taken in conjunction with the accompanying drawings, in which like reference numerals refer to like elements, and wherein.

DETAILED DESCRIPTION

Figure 1:
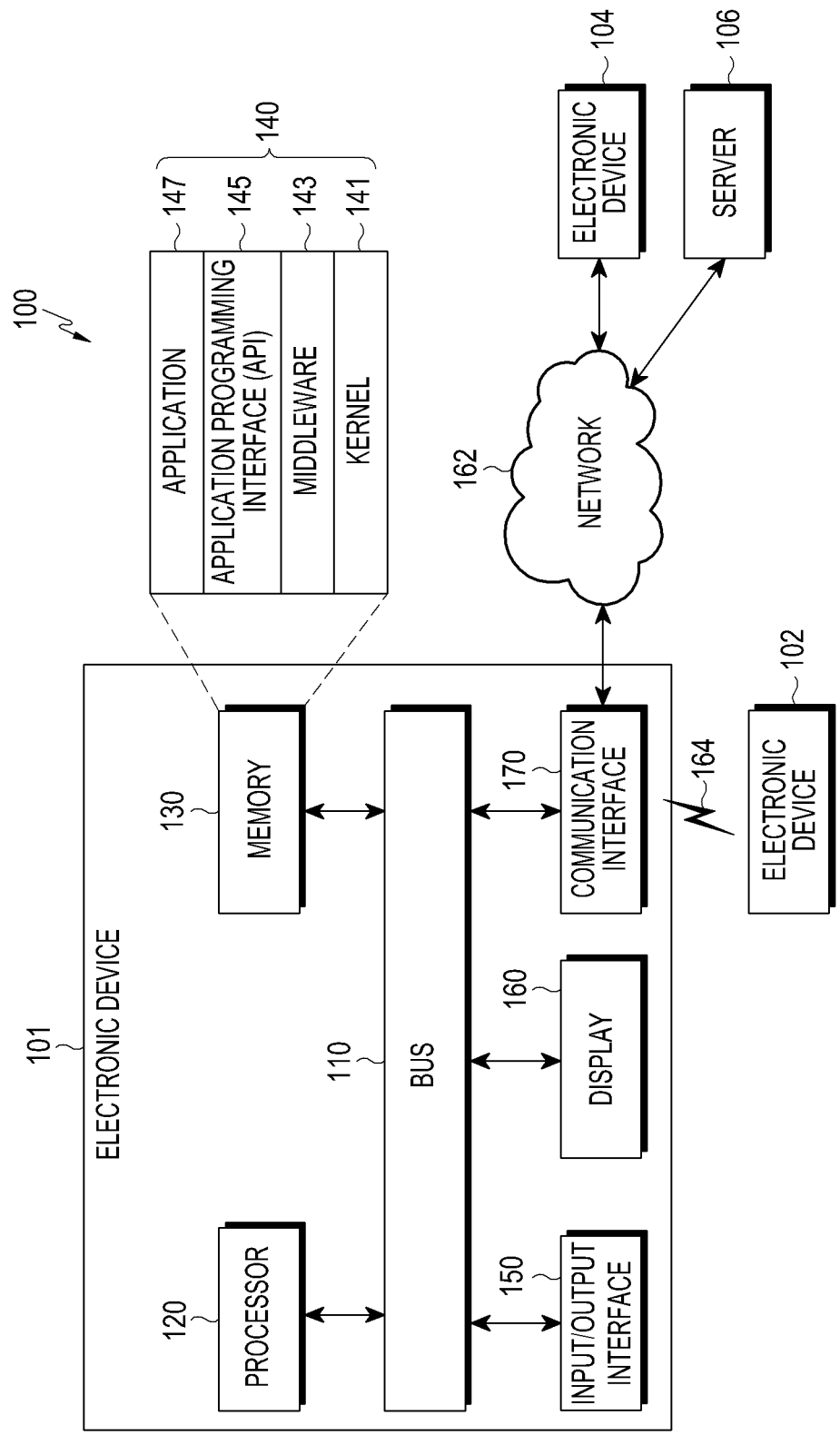
FIG. 1 is a diagram illustrating an example network environment that includes an electronic device according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware In some situations, the expression "device configured to" may refer, for example, to a situation in which the device, together with other devices or components, "is able to". For example, the phrase "processor adapted (or configured) to perform A, B, and C" may refer, for example, to various processing circuitry, such as, for example, and without limitation, a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing various example embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even if the term is defined in the present disclosure it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various example embodiments, the electronic device may be a combination of one or more of the aforementioned various devices. According to some example embodiments, the electronic device may also be a flexible device. Further, the electronic device according to an embodiment of the present disclosure is not limited to the aforementioned devices, and may include a new electronic device according to the development of technology.

Hereinafter, an electronic device according to various example embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various example embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some example embodiments, the electronic device 101 may omit at least one of the elements, or may further include other elements.

The bus 110 may include, for example, a circuit that interconnects the elements 110 to 170 and delivers communication (e.g., a control message and/or data) between the elements.

The processor 120 may include various processing circuitry, such as, for example, and without limitation, one or more of a dedicated processor, central processing unit (CPU), an application processor (AP), and a communication processor (CP). The processor 120, for example, may carry out operations or data processing relating to the control and/or communication of at least one other element of the electronic device 101. The processor 120 may be referred to as a controller, may include the controller as a part thereof, or may constitute the controller.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage, for example, system resources (e.g., the bus 110, the processor 120, and the memory 130) that are used to carry out operations or functions implemented by other programs (e.g., the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may serve as, for example, an intermediary that enables the API 145 or the application programs 147 to communicate with the kernel 141 to exchange data.

Furthermore, the middleware 143 may process one or more task requests received from the application programs 147 according to the priorities of the task requests. For example, the middleware 143 may assign priorities for using the system resources (e.g., the bus 110, the processor 120, the memory 130, etc.) of the electronic device 101 to one or more of the application programs 147. For instance, the middleware 143 may perform scheduling or load balancing on the one or more task requests by processing the one or more task requests according to the priorities assigned to the one or more application programs.

The API 145 is, for example, an interface through which the applications 147 control functions provided by the kernel 141 or the middleware 143, and may include, for example, at least one interface or function (e.g., instruction) for file control, window control, image processing, text control, etc.

The input/output interface 150 may include various input/output circuitry configured to serve as, for example, an interface that is capable of forwarding, to the other element(s) of the electronic device 101, instructions or data input from a user or a different external device. Furthermore, the input/output interface 150 may output, to the user or the external device, instructions or data received from the other element(s) of the electronic device 101.

Examples of the display 160 may include a liquid crystal display (LCD), a light-emitting diode (LED) display, an organic light-emitting diode (OLED) display, a microelectromechanical systems (MEMS) display, and an electronic paper display, or the like, but is not limited thereto. The display 160 may display, for example, various types of content (e.g., text, images, videos, icons, symbols, etc.) for a user. The display 160 may include a touch screen, and may receive, for example, a touch, gesture, proximity, or hovering input using an electronic pen or a part of a user's body.

The communication interface 170 may include various communication circuitry configured to provide, for example, communication between the electronic device 101 and an external electronic device (e.g., a first external electronic device 102, a second external electronic device 104, or a server 106). For example, the communication interface 170 may be connected to a network 162 through wireless or wired communication to communicate with the external electronic device (e.g., the second external electronic device 104 or the server 106).

The wireless communication may use, for example, at least one of long-term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), and the like, for example, as a cellular communication protocol. In addition, the wireless communication may include, for example, short range communication 164. The short range communication 164 may include, for example, at least one of WiFi, Bluetooth, near field communication (NFC), global navigation satellite system (GNSS), etc. The GNSS may include, for example, at least one of a global positioning system (GPS), a global navigation satellite system (Glonass), a Beidou navigation satellite system (hereinafter referred to as "Beidou"), and a European global satellite-based navigation system (Galileo) according to a place of usage, a bandwidth, or the like. Hereinafter, the "GPS" may be interchangeably used herein with the "GNSS". The wired communication may include, for example, at least one of a universal serial bus (USB), a high definition multimedia interface (HDMI), recommended standard 232 (RS-232), a plain old telephone service (POTS), etc. The network 162 may include at least one of a communication network such as a computer network (e.g., a LAN or a WAN), the Internet, and a telephone network.

Each of the first and second external electronic devices 102 and 104 may be of a type that is the same as, or different from, that of the electronic device 101. According to an example embodiment, the server 106 may include a group of one or more servers. According to various example embodiments, all or some of the operations executed in the electronic device 101 may be executed in another electronic device or a plurality of electronic devices (e.g., the electronic devices 102 and 104 or the server 106). According to an example embodiment, when the electronic device 101 has to perform some functions or services automatically or in response to a request, the electronic device 101 may request another device (e.g., the electronic device 102 or 104 or the server 106) to perform at least some functions relating thereto, instead of, or in addition to, performing the functions or services by itself. The other electronic device (e.g., the electronic device 102 or 104 or the server 106) may carry out the requested functions or the additional functions and may transmit the execution result to the electronic device 101. The electronic device 101 may provide the received result as it is, or may additionally process the received result to provide the requested functions or services. For example, cloud computing, distributed computing, or client-server computing technology may be used to achieve this.

Figure 2:
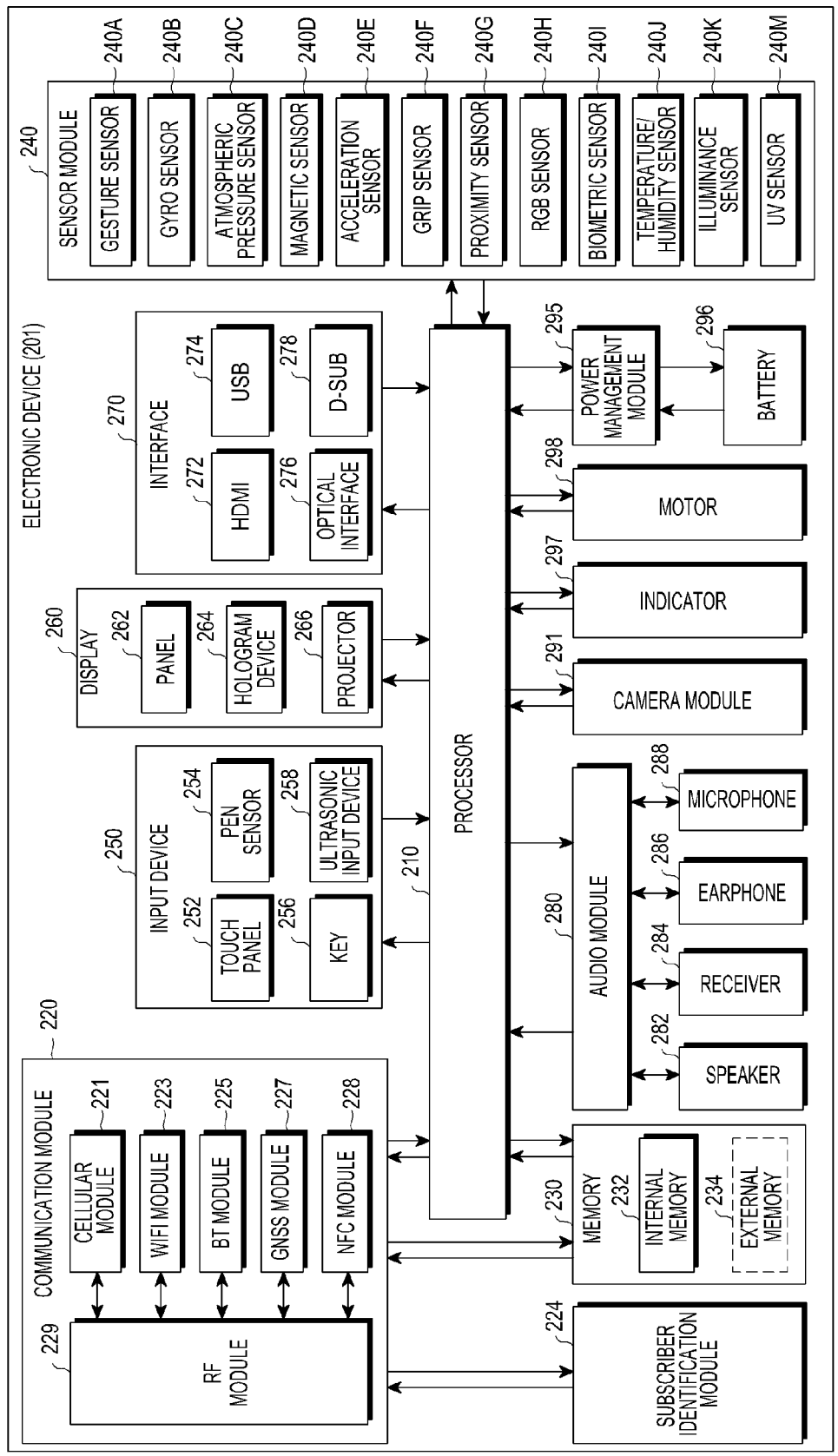
FIG. 2 is a block diagram illustrating an example electronic device according to various example embodiments.

FIG. 2 is a block diagram illustrating an example electronic device 201 according to various example embodiments. The electronic device 201 may include, for example, the entirety, or a part, of the electronic device 101 illustrated in FIG. 1. The electronic device 201 may include at least one processor (e.g., an application processor (AP)) (e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry configured to drive an operating system or application programs to control a plurality of hardware or software elements connected thereto and to perform various types of data processing and operations. The processor 210 may be embodied, for example, as various processing circuitry implemented as a system on chip (SoC). According to an example embodiment, the processor 210 may further include a graphic processing unit (GPU) and/or an image signal processor. The processor 210 may include at least some (e.g., a cellular module 221) of the elements illustrated in FIG. 2. The processor 210 may load, in a volatile memory, instructions or data received from at least one of the other elements (e.g., a non-volatile memory) to process the same and may store a variety of data in the non-volatile memory.

The communication module 220 may have a configuration that is the same as, or similar to, that of the communication interface 170 of FIG. 1. The communication module 220 may include various communication circuitry, such as, for example, and without limitation, the cellular module 221, a WiFi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a communication processor (CP).

The WiFi module 223, the Bluetooth module 225, the GNSS module 227, and the NFC module 228 may include, for example, processors for processing data transmitted/received through the corresponding modules, respectively. According to some embodiments, at least some (e.g., two or more) of the cellular module 221, the WiFi module 223, the Bluetooth module 225, the GNSS module 227, and the NFC module 228 may be included in one integrated chip (IC) or IC package. According to various embodiments, the WiFi module 223, the Bluetooth module 225, the GNSS module 227, and the NFC module 228 may individually establish a communication connection between the electronic device 101 and another device (e.g., the electronic device 102 or 104 or the server 106).

The RF module 229 may transmit/receive, for example, a communication signal (e.g., an RF signal). The RF module 229 may include, for example, a transceiver, a power amplifier module (PAM), a frequency filter, a low noise amplifier (LNA), an antenna, etc. According to another embodiment, at least one of the cellular module 221, the WiFi module 223, the Bluetooth module 225, the GNSS module 227, and the NFC module 228 may transmit/receive an RF signal through a separate RF module.

The subscriber identification module 224 may include, for example, a card containing a subscriber identification module and/or an embedded SIM, and may include unique identification information (e.g., an integrated circuit card identifier (ICCID)) or subscriber information (e.g., an international mobile subscriber identity (IMSI)).

The memory 230 (e.g., the memory 130) may include, for example, an internal memory 232 and/or an external memory 234. The internal memory 232 may include, for example, at least one of a volatile memory (e.g., a dynamic RAM (DRAM), a static RAM (SRAM), a synchronous dynamic RAM (SDRAM), etc.) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard disc drive, a solid state drive (SSD), etc.).

The external memory 234 may further include a flash drive, which may be, for example, a compact flash (CF), a secure digital (SD), a micro secure digital (Micro-SD), a mini secure digital (Mini-SD), an extreme digital (xD), a multi-media card (MMC), a memory stick, etc. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a red, green, and blue (RGB) sensor), a biometric sensor 240I, a temperature/humidity sensor 240J, an illuminance sensor 240K, and a ultraviolet (UV) sensor 240M. Additionally or alternatively, the sensor module 240A may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. In some embodiments, the electronic device 201 may further include a processor configured to control the sensor module 240 as a part of the processor 210, or separately from the processor 210, in order to control the sensor module 240 while the processor 210 is in a sleep state.

The input device 250 may include various input circuitry, such as, for example, and without limitation, a touch panel 252, a (digital) pen sensor 254, a key 256, or an ultrasonic input unit 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction for a user.

The (digital) pen sensor 254 may include, for example, a recognition sheet that is a part of the touch panel, or is separate from the touch panel. The key 256 may include, for example, a physical button, an optical key, or a keypad. The ultrasonic input device 258 may detect ultrasonic waves generated by an input tool through a microphone (e.g., a microphone 288) to identify data corresponding to the detected ultrasonic waves.

The display 260 (e.g., the display 160) may include a panel 262, a hologram device 264 or a projector 266. The panel 262 may include a configuration that is the same as, or similar to, that of the display 160 of FIG. 1. The panel 262 may be implemented to be, for example, flexible, transparent, or wearable. The panel 262, together with the touch panel 252, may be implemented as one module. The hologram device 264 may show a three-dimensional image in the air by using an interference of light. The projector 266 may display an image by projecting light onto a screen. The screen may be located, for example, in the interior of, or on the exterior of, the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert, for example, a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, etc.

The camera module 291 is a device that is capable of photographing a still image and a dynamic image. According to an embodiment, the camera module 291 may include one or more image sensors (e.g., a front sensor or a rear sensor), a lens, an image signal processor (ISP), or a flash (e.g., an LED, a xenon lamp, etc.).

The power management module 295 may manage, for example, the power of the electronic device 201. According to an embodiment, the power management module 295 may include a circuit for recharging the battery 296. According to an embodiment, the power management module 295 may include a power management integrated circuit (PMIC), a charger integrated circuit (IC), or a battery or fuel gauge. The PMIC may have a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate a particular state (e.g., a booting state, a message state, a charging state, etc.) of the electronic device 201 or a part (e.g., the processor 210) thereof. The motor 298 may convert an electrical signal into a mechanical vibration and may generate a vibration, a haptic effect, etc. Although not illustrated, the electronic device 201 may include a processing unit (e.g., a GPU) for supporting mobile TV. The processing unit for supporting mobile TV may process media data according to a standard, such as digital multimedia broadcasting (DMB), digital video broadcasting (DVB), MediaFlo™, etc.

Each of the above-described component elements of hardware according to the present disclosure may be configured with one or more components, and the names of the corresponding component elements may vary based on the type of electronic device. The electronic device according to various example embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
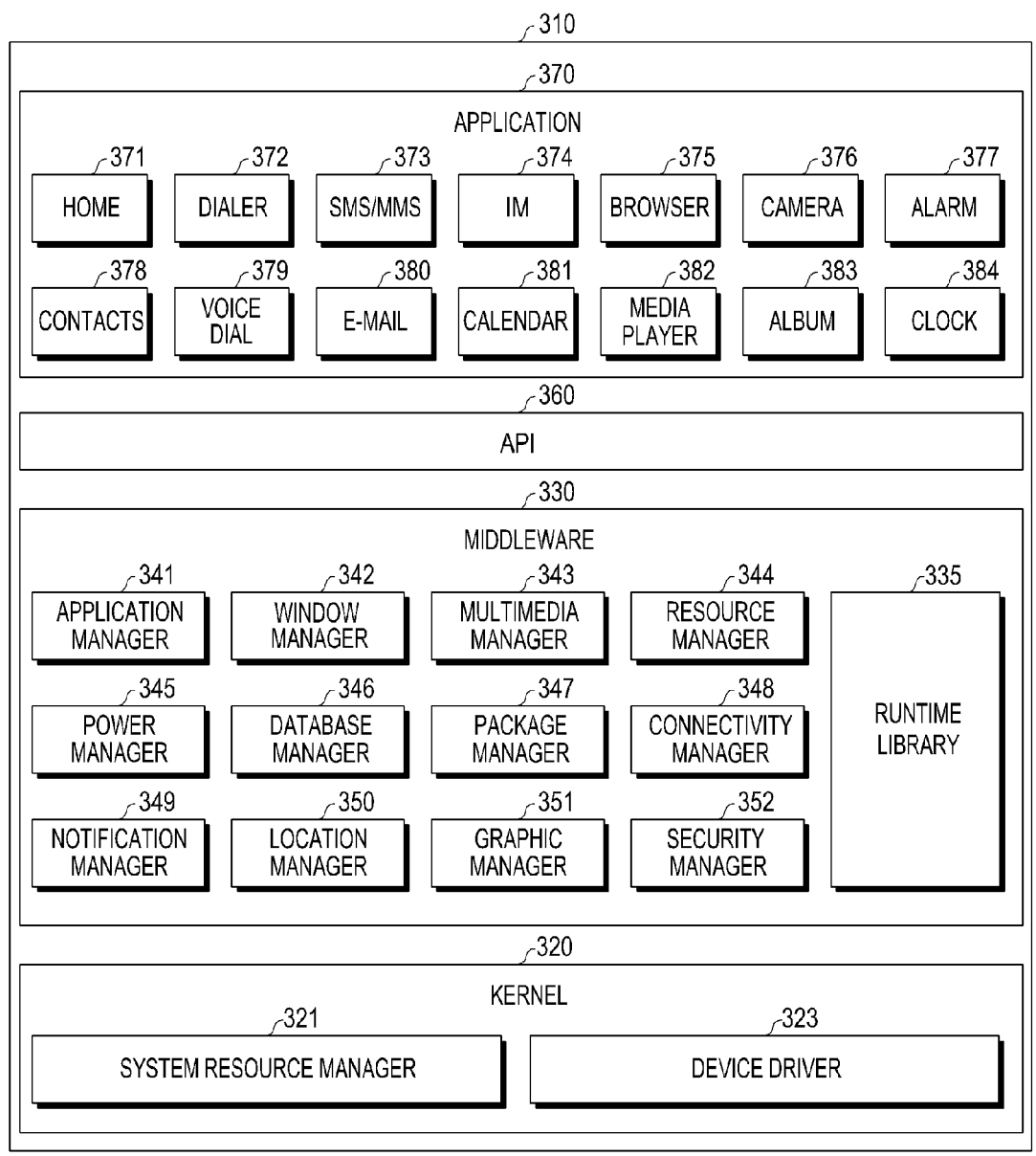
FIG. 3 is a block diagram illustrating an example program module according to various example embodiments.

FIG. 3 is a block diagram illustrating an example program module according to various example embodiments. According to an example embodiment, the program module 310 (e.g., the program 140) may include an operating system (OS) that controls resources relating to an electronic device (e.g., the electronic device 101) and/or various applications (e.g., the application programs 147) that are executed in the operating system. The operating system may be, for example, Android, iOS, Windows, Symbian, Tizen, Bada, etc.

The program module 310 may include a kernel 320, middleware 330, an application programming interface (API) 360, and/or applications 370. At least a part of the program module 310 may be preloaded on the electronic device, or may be downloaded from an external electronic device (e.g., the electronic device 102 or 104 or the server 106).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared-memory driver, a USB driver, a keypad driver, a WiFi driver, an audio driver, or an inter-process communication (IPC) driver.

The middleware 330 may provide, for example, a function required by the applications 370 in common, or may provide various functions to the applications 370 through the API 360 to enable the applications 370 to efficiently use limited system resources within the electronic device. According to an example embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the applications 370 are being executed. The runtime library 335 may perform input/output management, memory management, the functionality for an arithmetic function, etc.

The application manager 341 may manage, for example, the life cycle of at least one of the applications 370. The window manager 342 may manage GUI resources used on a screen. The multimedia manager 343 may determine formats required to reproduce various media files and may encode or decode a media file using a coder/decoder (codec) appropriate for the corresponding format. The resource manager 344 may manage resources (such as the source code, the memory, the storage space, etc.) of at least one of the applications 370.

The power manager 345 may operate together with, for example, a basic input/output system (BIOS) to manage a battery or power and to provide power information required for the operation of the electronic device. The database manager 346 may generate, search, and/or modify a database to be used by at least one of the applications 370. The package manager 347 may manage the installation or update of an application that is distributed in the form of a package file.

The connectivity manager 348 may manage a wireless connection, such as WiFi, Bluetooth, etc. The notification manager 349 may display or notify of an event (such as an arrival message, an appointment, a proximity notification, etc.) in such a manner as not to disturb a user. The location manager 350 may manage the location information of the electronic device. The graphic manager 351 may manage a graphic effect to be provided to a user and a user interface relating thereto. The security manager 352 may provide various security functions required for system security, user authentication, etc. According to an embodiment, in a case where the electronic device (e.g., the electronic device 101) has a telephone call function, the middleware 330 may further include a telephony manager for managing a voice or video call function of the electronic device.

The middleware 330 may include a middleware module that forms a combination of various functions of the aforementioned elements. The middleware 330 may provide specialized modules according to the types of operating systems in order to provide differentiated functions. Furthermore, the middleware 330 may dynamically remove some of the existing elements, or may add new elements.

The API 360 (e.g., the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application programs 147) may include one or more applications that are capable of performing functions, for example, home 371, dialer 372, SMS/MMS 373, instant message (IM) 374, browser 375, camera 376, alarm 377, contacts 378, voice dial 379, e-mail 380, calendar 381, media player 382, album 383, clock 384, health care (e.g., measuring exercise quantity or blood sugar), and environmental information (e.g., atmospheric pressure, humidity, temperature information, etc.).

According to an example embodiment, the applications 370 may include an application (hereinafter, referred to as an "information exchange application" for convenience of description) that supports information exchange between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of delivering, to the external electronic device (e.g., the electronic device 102 or 104), notification information generated by other applications (e.g., an SMS/MMS application, an e-mail application, a health care application, an environmental information application, etc.) of the electronic device 101. Furthermore, the notification relay application may, for example, receive notification information from the external electronic device and may provide the received notification information for a user.

The device management application may manage (e.g., install, delete, or update), for example, at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications operating on the external electronic device, or functions (e.g., a call function, a message function, etc.) that are provided by the external electronic device.

According to an example embodiment, the applications 370 may include applications (e.g., a health care application of a mobile medical appliance, etc.) that are specified according to attributes of an external electronic device (e.g., the electronic device 102 or 104). According to an embodiment, the applications 370 may include an application received from the external electronic device (e.g., the server 106, or the electronic device 102 or 104). According to an embodiment, the applications 370 may include preloaded applications or third-party applications that may be downloaded from a server. Names of the elements of the program module 310, according to the embodiment illustrated in the drawing, may vary depending on the types of operating systems.

According to various example embodiments, at least a part of the program module 310 may be implemented in software, firmware, hardware, or a combination of two or more thereof. At least a part of the program module 310 may be implemented (e.g., executed), for example, by a processor (e.g., the processor 210). At least a part of the program module 310 may include, for example, a module, a program, a routine, a set of instructions, and/or a process for performing one or more functions.

Figure 4:
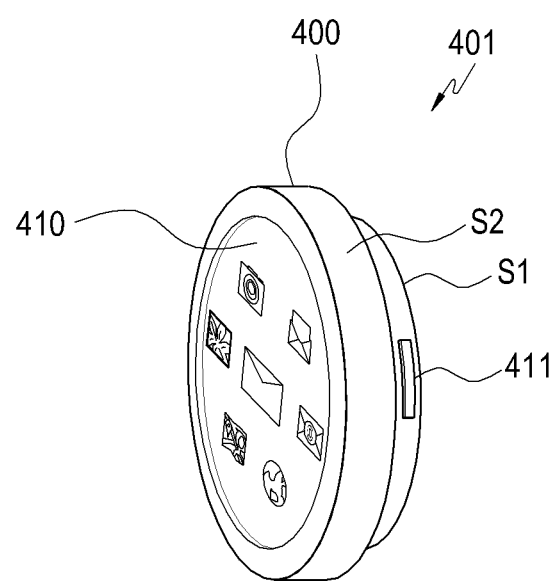
FIG. 4 is a perspective view of an example electronic device according to various example embodiments.

FIG. 4 is a perspective view of an example electronic device according to various example embodiments.

Referring to FIG. 4, the electronic device 401, according to the various example embodiments of the present disclosure, has various smart functions, including, for example, a communication function, and may be attached to, and detached from, an external electronic device. For example, the electronic device 401 may include a housing 400 that has: a front surface on which a display 410 is mounted; a rear surface S1 that is opposite to the front surface; and a side surface S2 between the rear surface S1 and the display 410. At least a part of the rear surface S1 of the housing may include a mounting surface that is placed in a mounting recess provided in the external electronic device. At least one fastening member 411 may be formed on at least one of the rear surface S1 and the side surface S2 so as to be attached to, and detached from, the external electronic device. While the fastening member 411 is illustrated in FIG. 4 as protruding from the side surface S2 of the housing, it will be understood by those skilled in the art that various forms of fastening members capable of being fastened to the external electronic device may be formed without being limited thereto. The fastening member may also be referred to herein as a fastener, but as noted above, is not limited to any specific or particular type of fastening member. The electronic device 401 may be used as a wearable device that can be worn on a part of a human body.

Figure 5A:
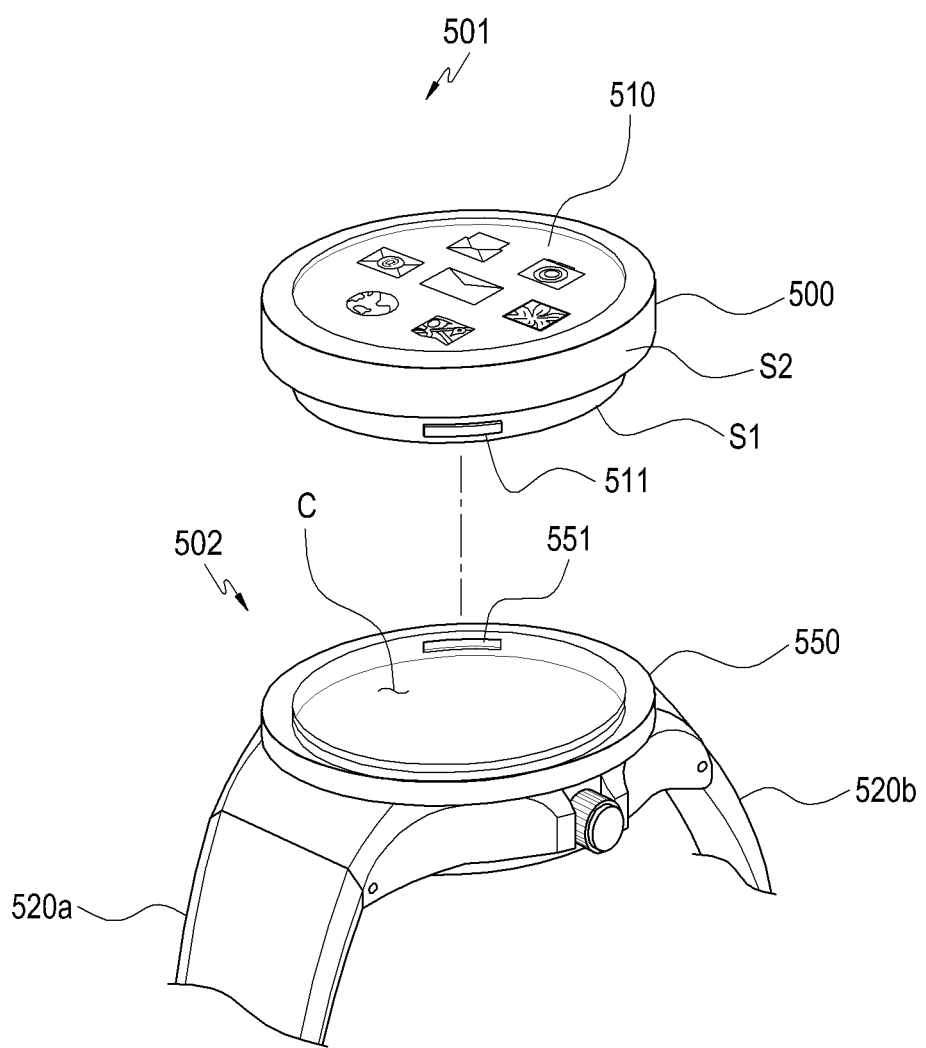
FIGS. 5A and 5B are diagrams illustrating examples of wearing an electronic device according to various example embodiments.
Figure 5B:
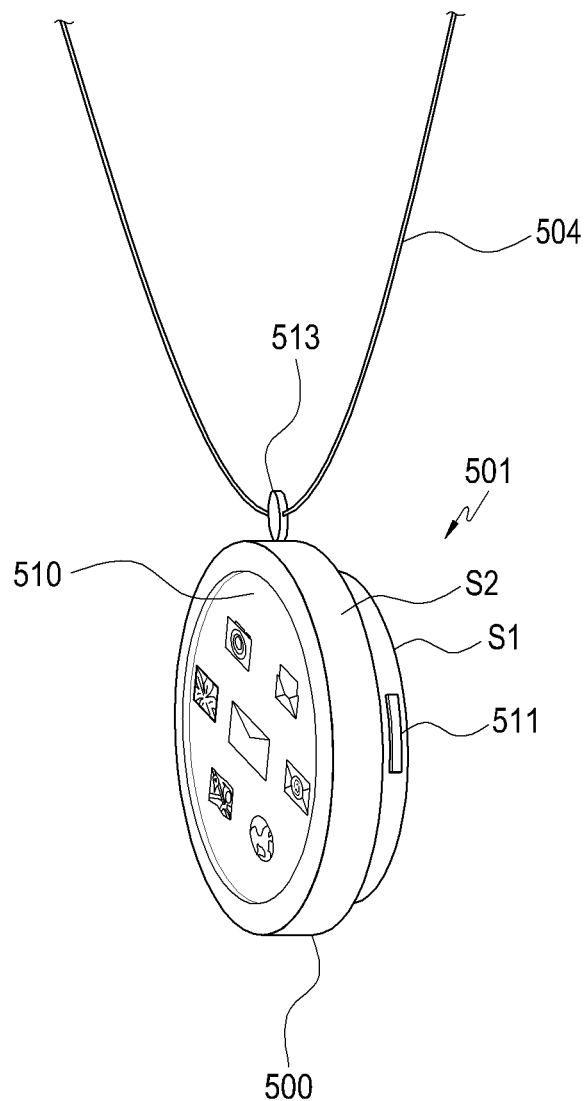

FIGS. 5A and 5B are diagrams illustrating examples of wearing an electronic device according to various example embodiments. The electronic device 501 may include a housing 500 that has: a front surface on which a display 510 is mounted; a rear surface S1 that is opposite to the front surface; and a side surface S2 between the rear surface S1 and the display 510.

Referring to FIG. 5A, the electronic device 501 may, for example, be worn in a watch form, such as a smart watch, on a part (e.g., a wrist) of a human body. For example, the electronic device 501 may be fastened to an external electronic device 502 through a fastening member 511 of the electronic device 501 and a fastening member 551 of the external electronic device 502 configured to receive the fastening member 511 if the electronic device by placing at least a part (e.g., a mounting surface) of the rear surface S1 or side surface S2 of the electronic device 501 in a mounting recess C provided in the housing 550 of the external electronic device 502. The electronic device 501 and the external electronic device 502 may be attached to, and detached from, each other through the fastening members 511 and 551 formed therein. The external electronic device 502 may further include wearing members 520a and 520b (e.g., straps) formed on opposite ends of the housing 550. The wearing members 520a and 520b may extend in opposite directions away from each other and may be coupled to each other. The wearing members 520a and 520 enable the electronic device 501 to be worn on a part (e.g., a wrist) of the human body.

Referring to FIG. 5B, the electronic device 501 may, for example, be worn in a pendant form, such as a smart pendant, around a part (e.g., the neck) of a human body. For example, the electronic device 501 may further include an ornamental member 513 (e.g., a hook or clasp) that is formed on at least one surface (e.g., the side surface S2) of the housing 500 thereof to hang on a wearing member 504 around a part (e.g., the neck) of the human body. The wearing member 504, on which the ornamental member 513 hangs, enables the electronic device 501 to be worn in a pendant form around a part (e.g., the neck) of the human body. As illustrated in FIGS. 5A and 5B, the electronic device 501, according to the various example embodiments, may be worn on a part of a user's body so that it may be used as a wearable device that provides various smart functions.

Figure 6A:
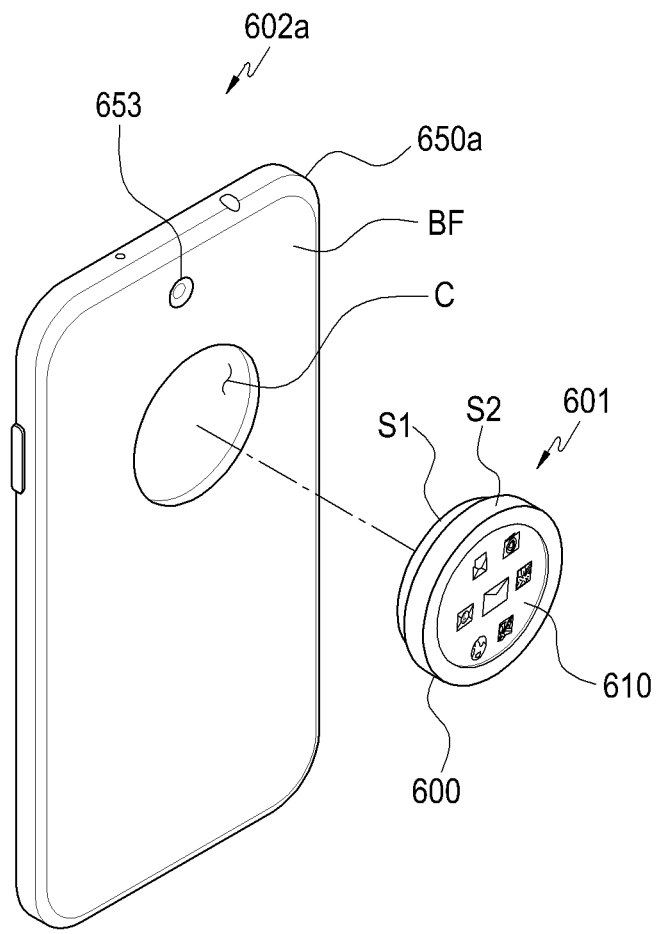
FIGS. 6A, 6B and 6C are diagrams illustrating examples of mounting an electronic device in an external electronic device, according to various example embodiments.
Figure 6B:
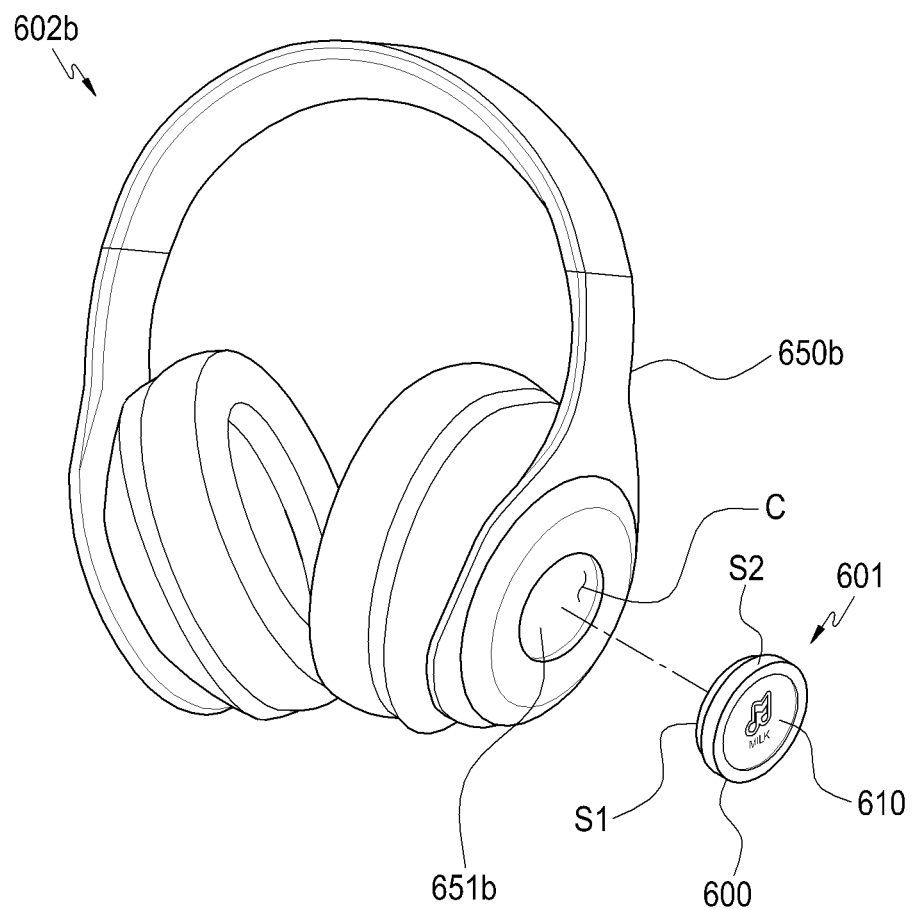
Figure 6C:
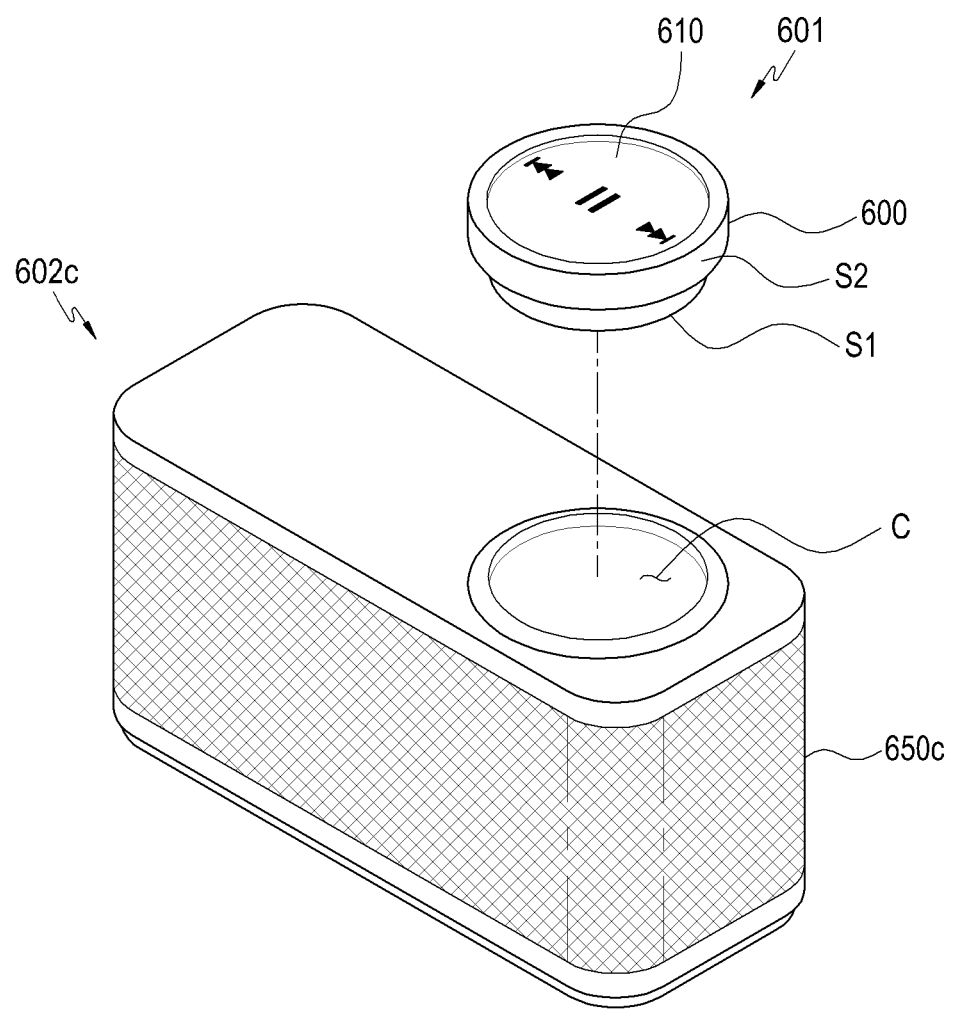

FIGS. 6A, 6B and 6C are diagrams illustrating examples of mounting an electronic device to various external electronic devices, according to various example embodiments. The electronic device, according to the various example embodiments, may be mounted in various smart devices (e.g., a smart phone, a headset, a Bluetooth speaker, and a smart band) to provide various functions, as well as being used as a simple wearable device. The electronic device 601 may include a housing 600 that has: a front surface on which a display 610 is mounted; a rear surface S1 that is opposite to the front surface; and a side surface S2 between the rear surface S1 and the display 610.

Referring to FIG. 6A, the electronic device 601 may be mounted in a mounting recess C formed in the rear surface BF of the housing 650a of an external electronic device 602a (e.g., a smart phone) that has a camera 653 disposed on the rear surface BF. The electronic device 601 may provide at least one preset function of a plurality of functions thereof according to the type of the external electronic device 602a. For example, in a case where the external electronic device 602a is a portable terminal, such as a smart phone, the electronic device 601 may provide at least one of a touch pad function, a dual display function, a smart pallet function, a remote controller function, a streaming function, and an input interface function under the control of the external electronic device 602a.

Referring to FIG. 6B, the electronic device 601 may be mounted in a mounting recess C formed in a part 651b of the housing 650b of an external electronic device 602b (e.g., a headset). For example, in a case where the external electronic device 602b is a headset, the electronic device 601 may provide a streaming function through the external electronic device 602b. For example, the external electronic device 602b may output data (e.g., sound source data, etc.) that is streamed by the electronic device 601.

Referring to FIG. 6C, the electronic device 601 may be mounted in a mounting recess C formed in a part of the housing 650c of an external electronic device 602c (e.g., a Bluetooth speaker). For example, in a case where the external electronic device 602c is a Bluetooth speaker, the electronic device 601 may provide at least one of a streaming function, an input interface function, and a charging function. For example, the external electronic device 602c may output data (e.g., sound source data, etc.) that is streamed by the electronic device 601. Furthermore, the external electronic device 602c may perform an input interface function by which the streamed data may be controlled (e.g., reproduced, paused, etc.) through the display 610 of the electronic device 601. In addition, the external electronic device 602c may have a charging module (e.g., a charging coil, etc.) for wireless charging that is disposed inside the mounting recess C, and may perform a wireless charging function of supplying wireless power to the electronic device 601 when the electronic device 601 is mounted therein. Descriptions of the aforementioned functions of the electronic device 601 will be given below in more detail with reference to FIGS. 7 to 14.

Figure 7:
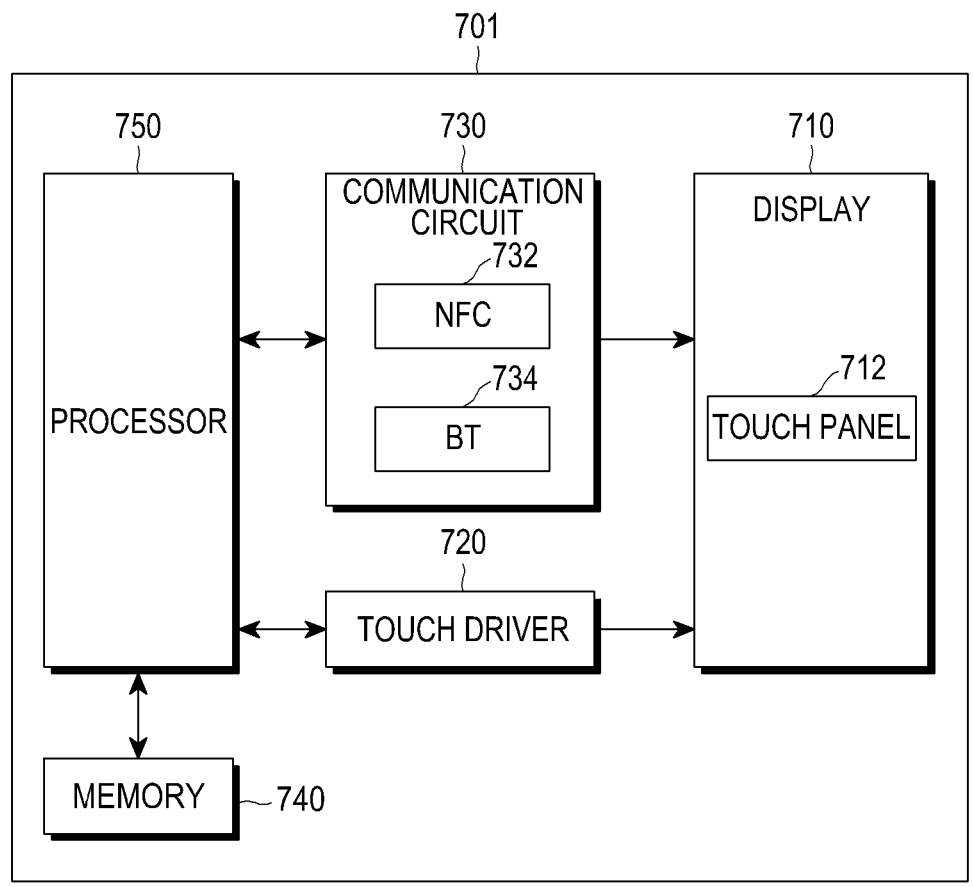
FIG. 7 is a block diagram illustrating an example electronic device according to various example embodiments.

FIG. 7 is a block diagram illustrating an example electronic device according to various example embodiments.

Referring to FIG. 7, the electronic device 701, according to the various example embodiments, may include a display 710, a touch driver (e.g., including touch driving circuitry) 720, a communication circuit (e.g., including various communication circuitry) 730, a memory 740, and a processor (e.g., including processing circuitry) 750. The electronic device 701 may include a part or the entirety of the electronic device 101 illustrated in FIG. 1 or the electronic device 201 illustrated in FIG. 2. Furthermore, the electronic device 701 may be configured and operated identically or similarly to the electronic devices 401, 501, and 601 of FIGS. 4, 5, and 6.

The display 710 may include a touch screen panel (TSP) 712 or a touch panel 712. The display 710 may provide a user with user interfaces that correspond to various services (e.g., a telephone call service, a data transmission service, a broadcasting service, and a photographing service). The display 710 may transmit, to at least one of the processor 750 and the touch driver 720, an (analogue) signal corresponding to at least one touch that is input to a user interface. The display 710 may receive an input of at least one touch caused by a user's body (e.g., a finger) or a touchable input means (e.g., a touch pen). Furthermore, the display 710 may receive an input of a continuous movement of one of the touches. The display 710 may transmit, to at least one of the processor 750 and the touch driver 720, an (analogue) signal corresponding to the continuous movement input. The touch may include a non-contact between the user's finger, or a touch pen, and the display 710 within a predetermined distance without being limited to the contact between the display 710 and the user's body (e.g., finger) or the touchable input means (e.g., touch pen). A distance that can be detected by the display 710 during the non-contact may vary according to the performance or structure of the electronic device 701. The display 710 may display various images according to various types of operating states, the execution of applications, services, and the like of the electronic device 701.

The touch driver 720 may include various touch driving circuitry configured to convert the analog signals received from the display 710 into a digital signal (e.g., X-coordinate and Y-coordinate) and may transmit the digital signal to the processor 750.

The communication circuit 730 may include various communication circuitry, such as, for example, and without limitation, an NFC communication circuit 732 and a Bluetooth (BT) communication circuit 734. The communication circuit 730 may include a part or the entirety of the communication interface 170 of FIG. 1 or the communication module 220 of FIG. 2. The communication circuit 730 may be referred to as a communication unit or a communication module, or may include the communication unit or the communication module as a part thereof or constitute the communication unit or the communication module.

The communication circuit 730 may establish a communication connection with an external electronic device. For example, the communication circuit 730 may establish a communication connection with an external electronic device in which the electronic device 701 is mounted. For example, the NFC communication circuit 732 may recognize an NFC tag close to the electronic device 701 through NFC communication. If the external electronic device that includes an NFC tag is close to the electronic device 701, the electronic device 701 may recognize the NFC tag through the NFC communication circuit 732 to identify the external electronic device.

According to an example embodiment, the NFC tag may include at least one of communication connection information (e.g., an ID and a password) for a communication connection with the external electronic device and information (e.g., type information) about the external electronic device.

The Bluetooth (BT) communication circuit 734 may establish a communication connection with a communication circuit of the external electronic device using the communication connection information (e.g., a Bluetooth ID and a password) among the information included in the recognized NFC tag.

The memory 740 may store instructions or data related to at least one other element of the electronic device 701. The memory 740 may include a part or the entirety of the memory 130 of FIG. 1. Furthermore, the memory 740 may store data relating to a plurality of functions that may be provided by the electronic device 701. In addition, the memory 740 may store at least one preset function, among the plurality of functions, corresponding to the type of an external electronic device connected with the electronic device 701.

The processor 750 may include various processing circuitry configured to control an overall operation of the electronic device 701. The processor 750 may include a part or the entirety of the processor 120 illustrated in FIG. 1 and the processor 210 illustrated in FIG. 2.

The processor 750 may determine whether a communication connection with an external electronic device has been established. For example, the processor 750 may determine the communication connection with the external electronic device according to whether an NFC tag is recognized through the NFC communication circuit 732 of the communication circuit 730. The processor 750 may determine that the electronic device 701 has been connected with the external electronic device that includes the recognized NFC tag when the NFC tag is recognized and may determine that the electronic device 701 is not connected with the external electronic device when the NFC tag is not recognized. When the NFC tag is recognized, the processor 750 may establish a communication connection with the external electronic device that includes the recognized NFC tag through the Bluetooth communication circuit 734 based on communication connection information included in the NFC tag. The processor 750 may determine the type of the connected external electronic device based on information (e.g., type information) about the external electronic device that includes the recognized NFC tag. The processor 750 may retrieve, from the memory 740, at least one function corresponding to the determined type of the external electronic device among a plurality of functions that may be provided by the electronic device 701, and may display the same on the display 710. The processor 750 may receive an input of a signal for a function selected by a user from the displayed functions. The processor 750 may set the electronic device 701 to perform the selected function and may notify the connected external electronic device that the electronic device 701 has been set to perform the selected function. The processor 750 may receive a control signal corresponding to the selected function from the connected external electronic device in response to the notification. The processor 750 may provide the selected function by means of the received control signal. For example, the at least one function may include at least one of a touch pad function, a dual display function, a smart pallet function, a remote controller function, a streaming function, an input interface function, a charging function, and a health care function. The operation of the processor 750 will be described below in greater detail with reference to FIGS. 8 to 14.

According to various example embodiments of the present disclosure, an electronic device may include: a housing; a display disposed to be exposed through one surface of the housing; at least one fastening member or fastener formed on at least one surface of the housing and configured to be attached to, and detached from, an external electronic device; a communication circuit disposed inside the housing and configured to establish a communication connection with the external electronic device; and a processor disposed inside the housing, and the processor may be configured to: determine whether the electronic device is connected with the external electronic device through the communication circuit; determine the type of the connected external electronic device when the electronic device is connected with the external electronic device; display, on the display, at least one preset function corresponding to the determined type of the external electronic device among a plurality of functions of the electronic device; and provide a function selected from the at least one function displayed on the display.

According to various example embodiments, the communication circuit may include: an NFC communication circuit that recognizes an NFC tag included in the external electronic device; and/or a Bluetooth communication circuit that establishes a communication connection with the external electronic device based on information included in the NFC tag.

According to various example embodiments, the information included in the NFC tag may include at least one of communication connection information or type information of the external electronic device.

According to various example embodiments, the processor may be configured to identify the type of the connected external electronic device based on the type information of the external electronic device.

According to various example embodiments, the processor may be configured to: set the electronic device to perform the function selected from the at least one preset function displayed on the display; notify the connected external electronic device that the electronic device has been set to perform the selected function; receive a control signal corresponding to the selected function from the connected external electronic device; and provide the selected function by means of the received control signal.

According to various example embodiments, the at least one preset function corresponding to the type of the external electronic device may include at least one of a touch pad function, a dual display function, a smart pallet function, a remote controller function, a streaming function, an input interface function, a charging function, or a health care function.

According to various example embodiments, the processor may be configured to control an input on a display of the connected external electronic device in response to a touch input on the display of the electronic device when the selected function is the touch pad function.

According to various example embodiments, the processor may be configured to display an image to be photographed using a camera module mounted on the rear surface of the external electronic device on at least one of the display of the electronic device or a display of the external electronic device when the selected function is the dual display function, and the display of the electronic device may be mounted in a mounting recess formed in the rear surface of the external electronic device through the fastener.

According to various example embodiments, the processor may be configured to: display an image to be photographed using a camera module mounted on the front surface of the external electronic device on a display of the external electronic device; and simultaneously display an image to be photographed using a camera module mounted on the rear surface of the external electronic device on the display of the electronic device that is mounted in a mounting recess formed in the rear surface of the external electronic device through the fastener when the selected function is the dual display function.

According to various example embodiments, the processor may be configured to display a body part to be recognized using a biometric module mounted on the rear surface of the external electronic device on at least one of the display of the electronic device or a display of the external electronic device when the selected function is the dual display function, and the display of the electronic device may be mounted in a mounting recess formed in the rear surface of the external electronic device through the fastener.

According to various example embodiments, an electronic device may include: a housing; at least one fastener formed on at least one surface of the housing and configured to be attached to, and detached from, an external electronic device; a communication circuit disposed inside the housing and configured to establish a communication connection with the external electronic device; and a processor disposed inside the housing, and the processor may be configured to: determine whether the electronic device is connected with the external electronic device through the communication circuit; and provide a function selected from at least one preset function corresponding to the type of the electronic device among a plurality of functions of the connected external electronic device when the electronic device is connected with the external electronic device.

According to various example embodiments, the processor may be configured to: receive, from the connected external electronic device, a notification that the connected external electronic device has been set to perform the function selected from the at least one function; generate a control signal corresponding to the selected function to transmit the control signal to the connected external electronic device; and allow the electronic device to provide the selected function by means of the transmitted control signal.

Figure 8:
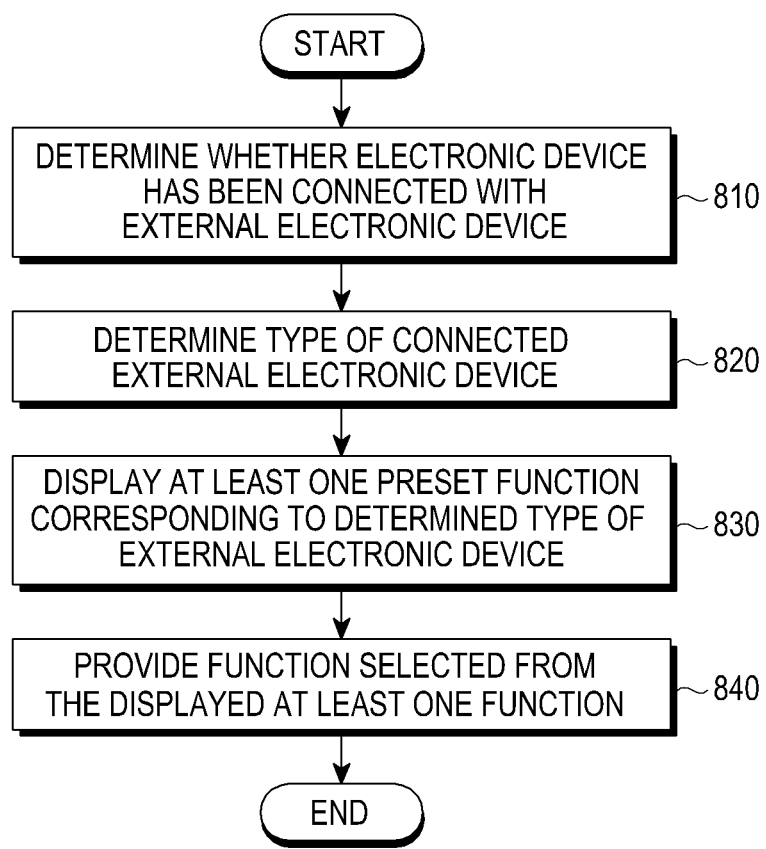
FIG. 8 is a flowchart illustrating an example method of operating an electronic device according to various example embodiments.

FIG. 8 is a flowchart illustrating an example method of operating an electronic device according to various example embodiments. The operating method for an electronic device may include operations 810 to 840. The operating method for an electronic device may be performed by at least one of the electronic device 701 and a processor of the electronic device (e.g., the processors 750, or the processor 120 or 210 of the electronic device 101 or 201). An external electronic device may include a part or the entirety of the external electronic device 102 or 104 illustrated in FIG. 1. Furthermore, the external electronic device may include a part or the entirety of the external electronic devices 602a to 602c of FIGS. 6A to 6C, which have communication modules.

In operation 810, for example, the electronic device may determine whether the electronic device has been connected with the external electronic device. According to an example embodiment, the electronic device may determine whether the electronic device has been connected with the external electronic device using an NFC tag recognition technology.

The electronic device may determine that the electronic device has been connected with the external electronic device when the NFC tag is recognized, and may establish a communication connection with the external electronic device based on information included in the recognized NFC tag. When the NFC tag is not recognized, the electronic device may determine that the electronic device is not connected with the external electronic device. In this case, the electronic device may independently operate as a smart device that provides various smart functions.

In operation 820, for example, the electronic device may determine the type of the connected external electronic device. For example, when the NFC tag is recognized, the electronic device may identify the type of the connected external electronic device based on type information of the external electronic device that includes the NFC tag among the information included in the NFC tag.

In operation 830, for example, the electronic device may display, on the display thereof, at least one preset function corresponding to the determined type of the external electronic device.

According to an example embodiment, the at least one function may include, for example, and without limitation, at least one of a touch pad function, a dual display function, a smart pallet function, a remote controller function, a streaming function, an input interface function, a charging function, or a health care function.

In operation 840, for example, the electronic device may provide a function selected from the at least one function displayed on the display thereof. For example, one of the displayed functions may be selected by a user input to the electronic device. Thereafter, the electronic device may be set to perform the selected function and may provide the selected function under the control of the external electronic device.

Figure 9:
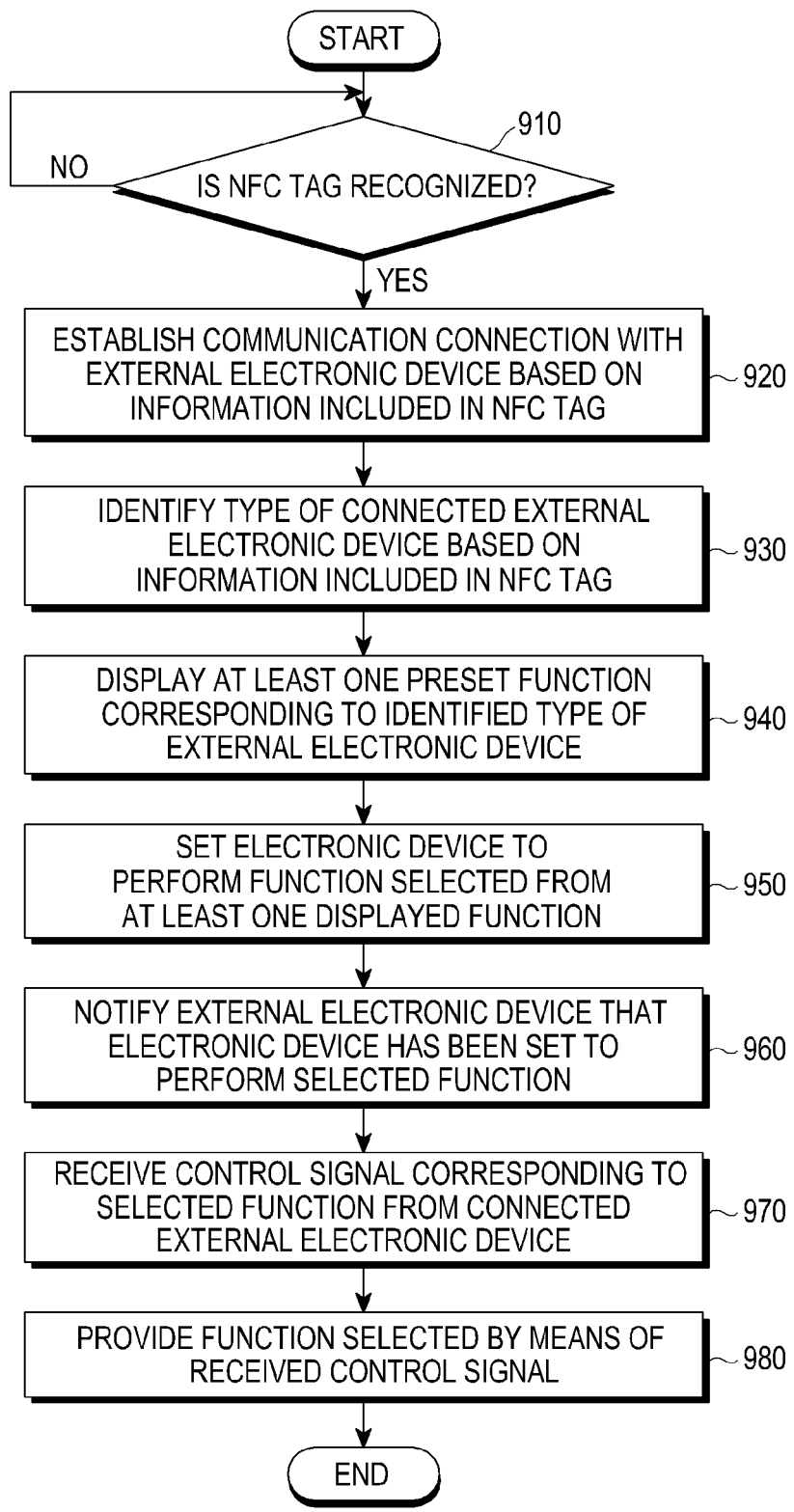
FIG. 9 is a flowchart illustrating an example method of operating an electronic device according to various example embodiments.

FIG. 9 is a flowchart illustrating an example method of operating an electronic device according to various example embodiments. The operating method for an electronic device may include operations 910 to 980. The operating method for an electronic device may be performed by at least one of the electronic device 701 and a processor of the electronic device (e.g., the processors 750, or the processor 120 or 210 of the electronic device 101 or 201). An external electronic device may include a part or the entirety of the external electronic device 102 or 104 illustrated in FIG. 1. Furthermore, the external electronic device may include a part or the entirety of the external electronic devices 602a to 602c of FIGS. 6A to 6C, which have communication modules.

In operation 910, for example, the electronic device may determine whether an NFC tag is recognized through an NFC communication module thereof. The electronic device may perform operation 920 when the NFC tag is recognized in operation 910, and may periodically or aperiodically repeat operation 910 when the NFC tag is not recognized.

According to an example embodiment, the NFC tag may include, for example, and without limitation, at least one of communication connection information for a connection with a communication module of the external electronic device that includes the NFC tag and information about the external electronic device. For example, the communication connection information may include an ID and a password for the connection with the communication module of the external electronic device. The information about the external electronic device may include type information of the external electronic device.

In operation 920, for example, the electronic device may establish a communication connection with the external electronic device that includes the NFC tag using the communication connection information among the information included in the NFC tag. For example, the electronic device may immediately establish the communication connection without a separate pairing operation or an ID and password input operation by performing the communication connection using the communication connection information included in the recognized NFC tag, that is, the ID and password of the communication module of the external electronic device.

According to an example embodiment, the communication connection between the electronic device and the external electronic device may be established through Bluetooth.

In operation 930, for example, the electronic device may identify the type of the communication-connected external electronic device based on the information included in the NFC tag. For example, the electronic device may identify the type of the external electronic device based on the type information of the external electronic device that is included in the NFC tag.

According to an example embodiment, the external electronic device may be of a portable device type (such as a smart phone) that includes a display, a hearable device type (such as a headset or a speaker), or a health care device type (such as a smart band) that includes a biometric-signal detection module.

In operation 940, for example, the electronic device may display, on the display thereof, at least one preset function corresponding to the determined type of the external electronic device.

According to an example embodiment, the at least one function may include at least one of a touch pad function, a dual display function, a smart pallet function, a remote controller function, a streaming function, an input interface function, a charging function, or a health care function.

According to an example embodiment, in an example where the connected external electronic device is of a portable device type, the at least one preset function may include at least one of a touch pad function, a dual display function, a smart pallet function, a streaming function, or an input interface function.

According to an example embodiment, in an example where the connected external electronic device is of a hearable device type, the at least one preset function may include at least one of a streaming function, an input interface function, or a charging function. For example, when the electronic device is connected with an external electronic device, such as a headset or a Bluetooth speaker, the electronic device may be set to perform a streaming function. The electronic device that is set to perform the streaming function may output, through the external electronic device, data stored in the electronic device or data (e.g., sound source data, etc.) that is streamed from the outside (such as the Internet). In this case, an input interface may be displayed on the display of the electronic device, and the electronic device may control to reproduce or stop the streamed data through the input interface.

According to an example embodiment, in an example where the connected external electronic device is a health care device, the at least one preset function may include a health care function. For example, when the electronic device is connected to an external electronic device (such as a smart band) that includes a biometric-signal detection module, the electronic device may be set to perform a health care function. The electronic device that is set to perform the health care function may diagnose a user's physical state based on a biometric signal detected by the external electronic device and may display the diagnosis result on the display thereof.

In operation 950, for example, the electronic device may be set to perform a function selected from the at least one displayed function. For example, one of the displayed functions may be selected by a user input to the electronic device. The electronic device may be set to perform the selected function.

In operation 960, for example, the electronic device may notify the connected external electronic device that the electronic device has been set to perform the selected function. In response to the notification, the external electronic device may generate a control signal corresponding to the selected function and may transmit the same to the electronic device in order to enable the connected electronic device to perform the selected function.

In operation 970, for example, the electronic device may receive the control signal corresponding to the selected function from the connected external electronic device.

In operation 980, for example, the electronic device may operate to provide the selected function by means of the received control signal. A method in which the electronic device operates to provide the selected function will be described below in greater detail with reference to FIGS. 10 to 14.

Figure 10:
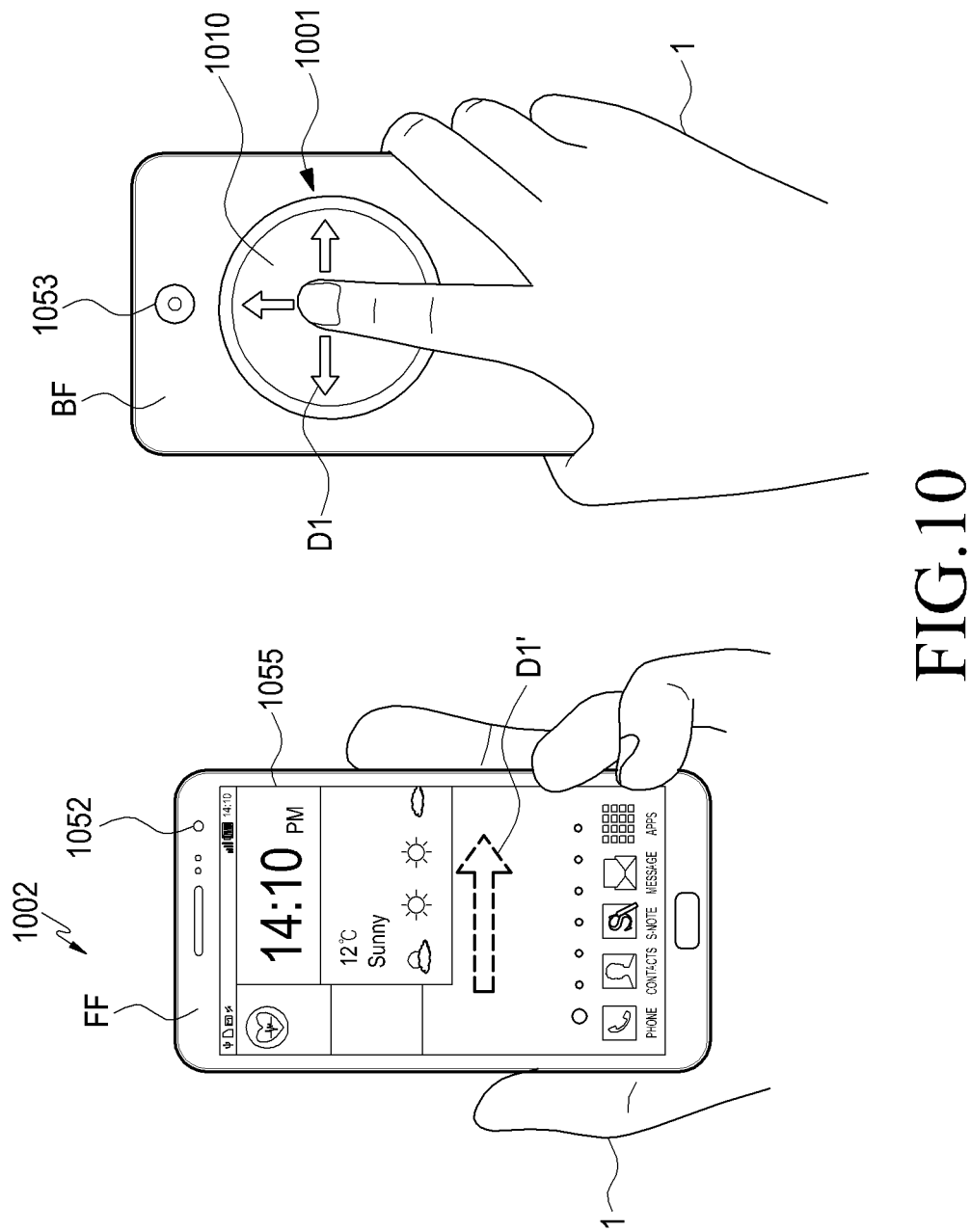
FIGS. 10, 11A, 11B, 12, 13 and 14 are diagrams illustrating examples of various functions provided when electronic devices are connected with external electronic devices, according to various example embodiments.

FIG. 10 is a diagram illustrating an example of various functions provided when an electronic device is connected with an external electronic device, according to various example embodiments. The electronic device 1001 may, for example, provide a touch pad function when being connected with the external electronic device 1002. The touch pad function may control a touch input on a display 1055 of the connected external electronic device 1002 in response to a touch input on a display 1010 of the electronic device 1001.

Referring to FIG. 10, the electronic device 1001 may be mounted on the rear surface BF of the external electronic device 1002 on which a camera 1053 is disposed, and may control the display 1055 (hereinafter, referred to as the front display disposed on a front surface FF) of the external electronic device 1002 through a back hand motion using the display 1010 (hereinafter, referred to as the rear display) of the electronic device 1001.

The rear display 1010 of the electronic device 1001 may operate as a touch pad for controlling the display 1055 (hereinafter, referred to as the front display) of the external electronic device 1002. For example, in a case where the display 1055 of the external electronic device 1002 has a large screen (e.g., five inches or more) so that it is difficult for a user to control the display 1055 with one hand, the user may control the front display 1055 through a back hand motion using the rear display 1010 of the electronic device 1001 that is mounted on the rear surface of the external electronic device 1002. For example, when the user swipes a part (an index finger) of his/her body over the rear display 1010 in direction D1, a swipe may be made on the front display 1055 in the same direction (that is, in direction D1'), as illustrated in FIG. 10.

As described above, when the electronic device 1001 is set to perform a touch pad function, the rear display 1010 and the front display 1055 may operate in conjunction with each other so that a motion or touch input corresponding to a back hand motion on the rear display 1010 may be reflected on the front display 1055, thereby controlling the front display 1055.

Although only the swipe operation is illustrated in FIG. 10, it will be understood by those skilled in the art that all display control operations, including a touch input, a scroll, a tap, a double tap, a click, a double click, a flick, and the like, may be included without being limited thereto.

Figure 11A:
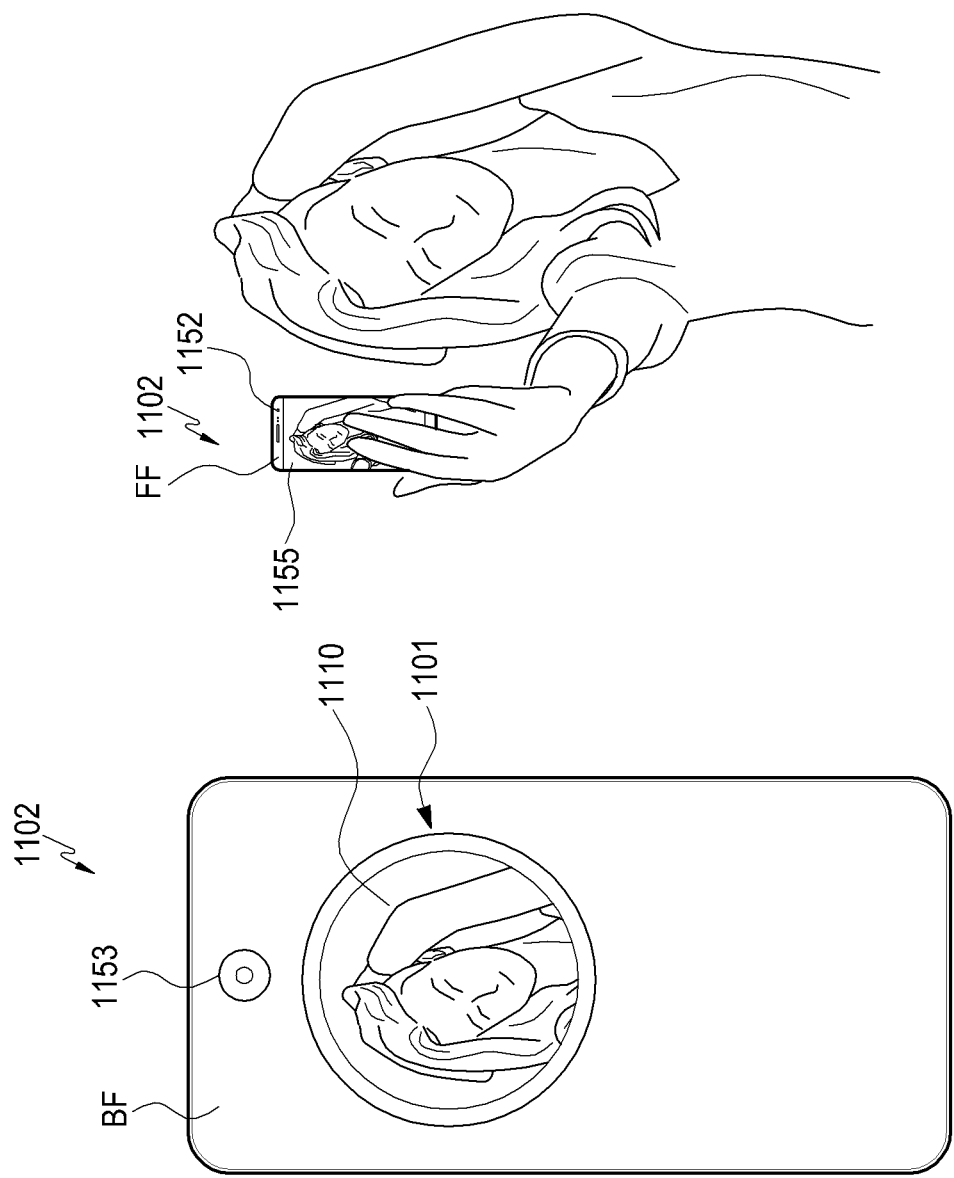
Figure 11B:
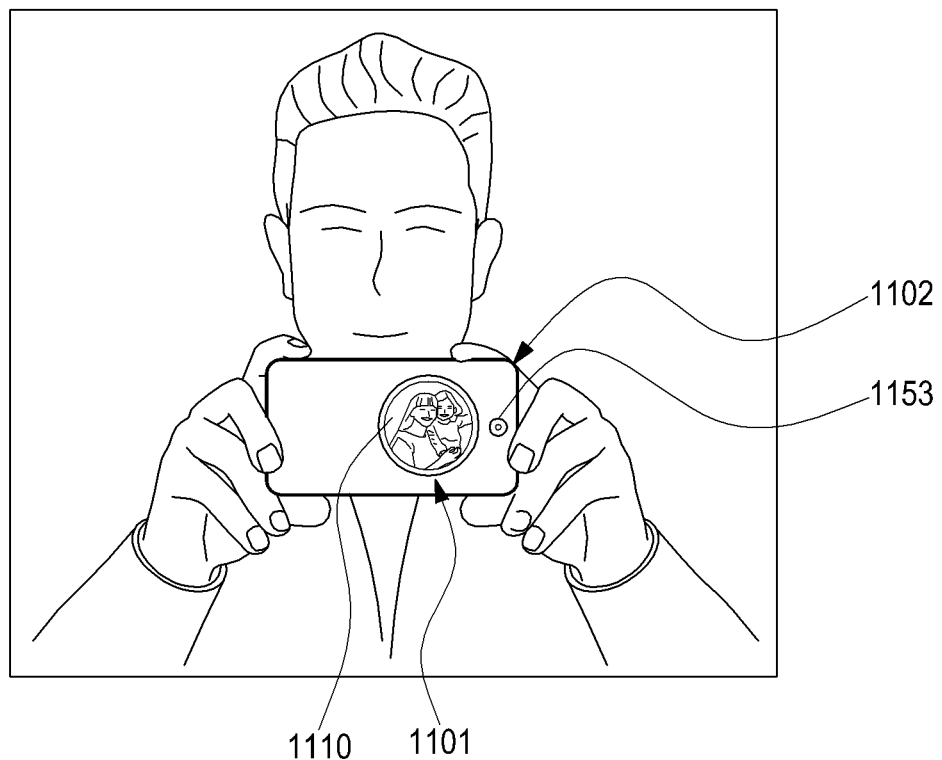
Figure 12:
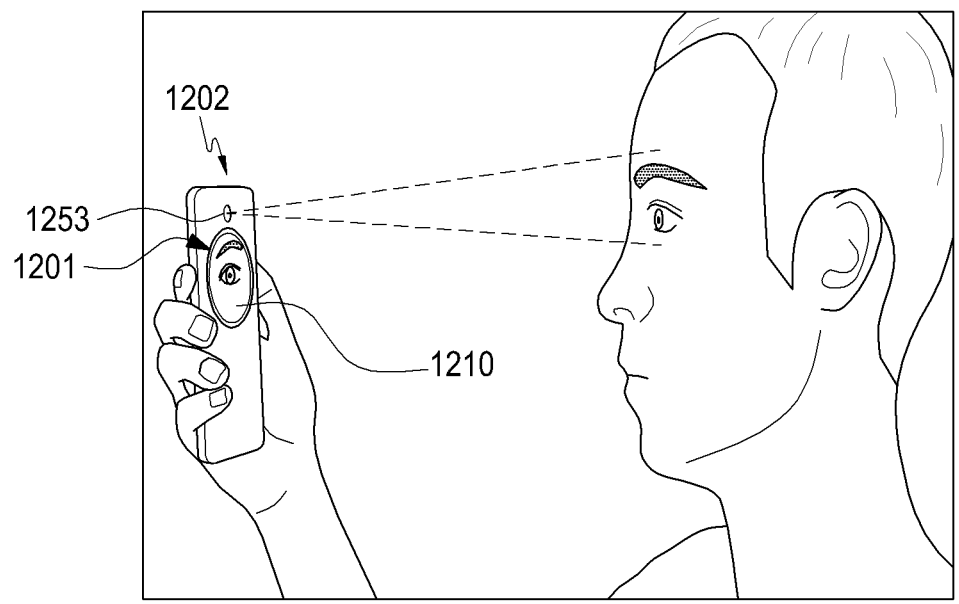

FIGS. 11A, 11B, and 12 are diagrams illustrating examples of various functions provided when an electronic device is connected with an external electronic device, according to various example embodiments. The electronic device 1101 may, for example, provide a dual display function when being connected with the external electronic device 1102.

Referring to FIGS. 11A and 11B, the electronic device 1101 may be set to perform a dual display function of displaying an image of a subject on a front display 1155 and a rear display 1110 when the image is photographed through a rear camera 1153 mounted on the rear surface BF of the external electronic device 1102.

The external electronic device 1102 may generally include a front camera module 1152 and the rear camera module 1153. The front camera module 1152 may have a resolution lower than that of the rear camera module 1153. Accordingly, when a high-resolution image is required, the image may be photographed using the rear camera module 1153. In the related art, when a subject (e.g., a user) takes a selfie using the rear camera module 1153, the subject is displayed through the front display 1155, but the subject cannot view its selfie since the subject faces the rear camera module 1153. However, according to this example embodiment, in a case where the electronic device 1101 is mounted on the rear surface BF of the external electronic device 1102 to perform a dual display function as illustrated in FIG. 11A, a subject may be displayed on the display 1110 of the electronic device 1101 when the subject takes a selfie using the rear camera module 1153. The display 1110 of the electronic device 1101 may function as the rear display of the external electronic device 1102. Accordingly, the subject may take a selfie through the rear camera 1153 while identifying its picture, thereby not only acquiring a high-resolution selfie, but also improving convenience of use.

Likewise, even when a third party takes a photo of subjects using the rear camera 1153 of the external electronic device 1102 as illustrated in FIG. 11B, the subjects may identify their pictures photographed by the third party through the rear display 1110 of the electronic device 1101.

Furthermore, when the electronic device 1101 performs a dual display function, the electronic device may provide various display functions while photographing, although this is not illustrated in FIGS. 11A and 11B. For example, when a user takes a photo using the front camera module 1152 of the external electronic device 1102, the photo may be displayed on at least one of the front display 1155 of the external electronic device 1102 and the rear display 1110 of the electronic device 1101. Furthermore, even when a user takes a photo using the rear camera module 1153 of the external electronic device 1102, the photo may be displayed on at least one of the front display 1155 of the external electronic device 1102 and the rear display 1110 of the electronic device 1101. Alternatively, an image to be photographed using the front camera module 1152 of the external electronic device 1102 may be displayed on the front display 1155 of the external electronic device 1102, and an image to be photographed using the camera module 1153 mounted on the rear surface of the external electronic device 1102 may be simultaneously displayed on the rear display 1110 of the electronic device 1101.

Referring to FIG. 12, when, for example, a biometric application is executed on an external electronic device 1202, an electronic device 1201 may display, through a rear display 1210 thereof, an image of a body part (e.g., an iris) that is photographed using a rear camera module 1253 disposed on the rear surface of the external electronic device 1202, or using a separate biometric module (not illustrated). The recognition of biometric information, such as an iris, requires a high-resolution image, and a subject's body part to be recognized and a camera module (e.g., the rear camera module 1253) or a separate biometric module have to be accurately aligned with each other in order to acquire accurate biometric information. The subject may acquire biometric information through the rear camera module 1253 in order to acquire a high-resolution image when acquiring the biometric information. In this case, the subject may identify the position of its body part displayed through the rear display 1210 to locate its body part in the accurate position to accurately align the subject's body part and the rear camera module 1253 or the separate biometric module. As described above, in the acquisition of biometric information, the accurate position of a body part to be photographed may be identified and adjusted through the rear display 1253, which facilitates the acquisition of high-resolution biometric information.

Figure 13:
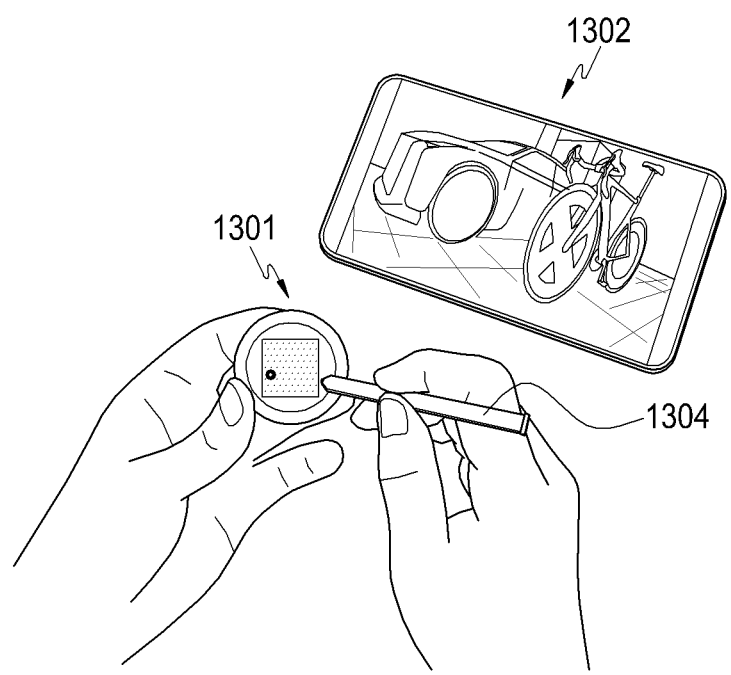

FIG. 13 is a diagram illustrating an example of various functions provided when an electronic device is connected with an external electronic device, according to various example embodiments. The electronic device 1301 may, for example, provide a smart pallet function when being connected with the external electronic device 1302. For example, the smart pallet function may control to display a smart pallet color system on the display of the electronic device 1301 and to apply a selected color to the display of the external electronic device 1302 connected with the electronic device 1301 when the color is selected from the smart pallet color system using an electronic pen 1304. In this example, the electronic device 1301 may not by physically or mechanically coupled or connected to the external electronic device 1302, but instead may be simply in communication with the external electronic device 1302. Accordingly, the electronic device 1301 may function as a smart pallet of the external electronic device 1302. Through the smart pallet function, a display space as much as the display space of the pallet color system may be ensured on the display of the external electronic device 1302, thereby improving convenience of use.

Figure 14:
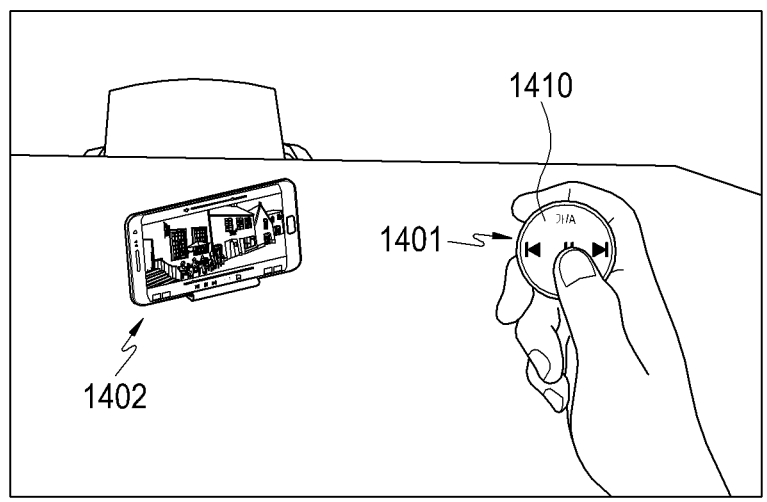

FIG. 14 is a diagram illustrating another example of various functions provided when an electronic device is connected with an external electronic device, according to various example embodiments. The electronic device 1401 may, for example, provide a remote controller function when being connected with the external electronic device 1402.

Referring to FIG. 14, when the electronic device 1402 is set to perform a remote controller function, the electronic device 1401 may act as a remote controller that is capable of remotely controlling the external electronic device 1402. An input interface for controlling the external electronic device 1402 may be displayed on a display 1410 of the electronic device 1401, and a user may remotely control the operation of the external electronic device 1402 through the input interface. As with the example embodiment illustrated in FIG. 13, the electronic device 1401 may not be mechanically or physically connected or coupled to the external electronic device 1402, but may instead be in operative communication with the external electronic device 1402

According to various example embodiments, a method for operating an electronic device may include: determining whether the electronic device is connected with an external electronic device; determining the type of the connected external electronic device when the electronic device is connected with the external electronic device; displaying, on a display of the electronic device, at least one preset function corresponding to the determined type of the external electronic device among a plurality of functions of the electronic device; and providing a function selected from the at least one function displayed on the display.

According to various example embodiments, determining whether the electronic device is connected with the external electronic device may include: determining whether an NFC tag is recognized; and when the NFC tag is determined to be recognized, determining that the electronic device has been connected with the external electronic device and establishing a communication connection with the external electronic device based on information included in the NFC tag.

According to various example embodiments, the information included in the NFC tag may include at least one of communication connection information or type information of the external electronic device.

According to various example embodiments, determining the type of the connected external electronic device may include identifying the type of the connected external electronic device based on the type information of the external electronic device.

According to various example embodiments, providing the function selected from the at least one function displayed on the display may include: setting the electronic device to perform the function selected from the at least one function displayed on the display; notifying the connected external electronic device that the electronic device has been set to perform the selected function; receiving a control signal corresponding to the selected function from the connected external electronic device; and providing the selected function by means of the received control signal.

According to various example embodiments, the at least one preset function corresponding to the type of the external electronic device may include at least one of a touch pad function, a dual display function, a smart pallet function, a remote controller function, a streaming function, an input interface function, a charging function, or a health care function.

According to various example embodiments, providing the selected function may include controlling a touch input on a display of the connected external electronic device in response to a touch input on the display of the electronic device when the selected function is the touch pad function.

According to various example embodiments, providing the selected function may include displaying an image to be photographed using a camera module mounted on the rear surface of the external electronic device on at least one of the display of the electronic device and a display of the external electronic device when the selected function is the dual display function, and the display of the electronic device may be mounted in a mounting recess formed in the rear surface of the external electronic device through the fastening member.

According to various example embodiments, providing the selected function may include displaying an image to be photographed using a camera module mounted on the front surface of the external electronic device on a display of the external electronic device and simultaneously displaying an image to be photographed using a camera module mounted on the rear surface of the external electronic device on the display of the electronic device that is mounted in a mounting recess formed in the rear surface of the external electronic device through the fastening member when the selected function is the dual display function.

According to various example embodiments, providing the selected function may include displaying a body part to be recognized using a biometric module mounted on the rear surface of the external electronic device on at least one of the display of the electronic device and a display of the external electronic device in a case where the selected function is the dual display function, and the display of the electronic device may be mounted in a mounting recess formed in the rear surface of the external electronic device through the fastening member.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing at least one function or a part thereof. The "module" may be mechanically or electronically implemented. For example, the "module" according to the present disclosure may include various processing circuitry, such as, for example, and without limitation, at least one of a dedicated processor, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming circuit form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming circuit according to the present disclosure may include one or more of the aforementioned components or may further include other additional components, or some of the aforementioned components may be omitted. Operations executed by a circuit, a programming circuit, or other component elements according to various example embodiments of the present disclosure may be executed sequentially, in parallel, repeatedly, or in a heuristic manner. Further, some operations may be executed according to another order or may be omitted, or other operations may be added.

According to various example embodiments, in a storage medium that stores instructions, the instructions are set to allow at least one processor to perform at least one operation when executed by the at least one processor, and the at least one operation may include: an operation of determining whether the electronic device is connected with an external electronic device; an operation of determining the type of the connected external electronic device when the electronic device is connected with the external electronic device; an operation of displaying, on a display of the electronic device, at least one preset function corresponding to the determined type of the external electronic device among a plurality of functions of the electronic device; and an operation of providing a function selected from the at least one function displayed on the display.

Various example embodiments disclosed herein are provided merely to easily describe technical details of the present disclosure and to aid in understanding of the present disclosure, and are not intended to limit the scope of the present disclosure. Accordingly, the scope of the present disclosure should be understood as including all modifications or various other embodiments based on the technical idea of the present disclosure.

What is claimed is:

1. An electronic device comprising:
a housing:
a display disposed to be exposed through one surface of the housing;
at least one fastener formed on at least one surface of the housing and configured to be attached to, and detached from, an external electronic device;
a communication circuit disposed inside the housing and configured to establish a communication connection with the external electronic device; and
a processor disposed inside the housing, wherein the processor is configured to:
detect whether the electronic device is connected with the external electronic device through the communication circuit;
in response to detection of the external electronic device connected with the electronic device, determine a type of the connected external electronic device; and
provide a dual display function via the display and a display of the external electronic device from among at least one preset function corresponding to the determined type of the external electronic device.

2. The electronic device of claim 1, wherein the communication circuit comprises:
an NFC communication circuit configured to recognize an NFC tag included in the external electronic device; and
a Bluetooth communication circuit configured to establish a communication connection with the external electronic device based on information included in the NFC tag.

3. The electronic device of claim 2, wherein the information included in the NFC tag comprises at least one of: communication connection information and type information of the external electronic device.

4. The electronic device of claim 3, wherein the processor is configured to identify the type of the connected external electronic device based on the type information of the external electronic device.

5. The electronic device of claim 1, wherein the processor is further configured to:

display, on the display, the at least one preset function corresponding to the determined type of the external electronic device form among a plurality of functions of the electronic device:
set the electronic device to perform a function selected from the at least one function displayed on the display;
notify the connected external electronic device that the electronic device has been set to perform the selected function;
receive a control signal corresponding to the selected function from the connected external electronic device; and
provide the selected function based on the received control signal.

6. The electronic device of claim 1, wherein the at least one preset function corresponding to the type of the external electronic device further comprises at least one of: a smart pallet function, a remote controller function, a streaming function, an input interface function, a charging function, and a health care function.

7. The electronic device of claim 1, wherein the display includes a touch panel, and the dual display function includes a touch pad function using the touch panel,
wherein the processor is configured to control an input on a the display of the connected external electronic device to adapt a touch input on the display received through the touch panel of the electronic device, in response to a receipt of a selection of the touch pad function.

8. The electronic device of claim 1, wherein the processor is configured to display, in response to a receipt of a selection of the dual display function, an image photographed using a camera mounted on a rear surface of the external electronic device on at least one of the display of the electronic device or the display of the external electronic device, the display of the electronic device being mounted in a mounting recess formed in the rear surface of the external electronic device through the fastener.

9. The electronic device of claim 1, wherein the processor is configured to display, in response to a receipt of a selection of the dual display function, an image photographed using a camera mounted on the front surface of the external electronic device on a display of the external electronic device and to simultaneously display an image photographed using a camera mounted on the rear surface of the external electronic device on the display of the electronic device mounted in a mounting recess formed in the rear surface of the external electronic device through the fastener.

10. The electronic device of claim 1, wherein the processor is configured to display, in response to a receipt of a selection of the dual display function, a body part to be recognized using a biometric sensor mounted on the rear surface of the external electronic device on at least one of the display of the electronic device or the display of the external electronic device, the display of the electronic device being mounted in a mounting recess formed in the rear surface of the external electronic device through the fastener.

11. A method for operating an electronic device, comprising:
detecting whether the electronic device is connected with an external electronic device;
in response to detection of the external electronic device connected with the electronic device, determining the type of the connected external electronic device; and
providing a dual display function using the display and a display of the external electronic device from among at least one preset function corresponding to the determined type of the external electronic device.

12. The method of claim 11, wherein detecting whether the electronic device is connected with the external electronic device comprises:
detecting whether an NFC tag is recognized: and
in response to detection of the recognized NFC tag, determining that the electronic device is connected with the external electronic device and establishing a communication connection with the external electronic device based on information included in the NFC tag.

13. The method of claim 12, wherein the information included in the NFC tag comprises at least one of: communication connection information and type information of the external electronic device.

14. The method of claim 11, further comprising:
displaying, on the display, the at least one preset function corresponding to the determined type of the external electronic device form among a plurality of functions of the electronic device;
setting the electronic device to perform the function selected from the at least one function displayed on the display;
notifying the connected external electronic device that the electronic device has been set to perform the selected function;
receiving a control signal corresponding to the selected function from the connected external electronic device; and
providing the selected function based on the received control signal.

15. The method of claim 11, wherein the dual display function includes a touch pad function,
wherein the providing the dual display function comprises controlling a touch input on a display of the connected external electronic device to adapt a touch input on the display of the electronic device, in response to a receipt of a selection of the touch pad function.

16. The method of claim 11
wherein the providing the dual display function comprises displaying, in response to a receipt of a selection of the dual display function, an image photographed using a camera mounted on the rear surface of the external electronic device on at least one of the display of the electronic device and the display of the external electronic device, the display of the electronic device being mounted in a mounting recess formed in the rear surface of the external electronic device through a fastener.

17. The method of claim 11,
wherein the providing the display function comprises displaying, in response to a receipt of a selection of the dual display function, an image photographed using a camera mounted on the front surface of the external electronic device on the display of the external electronic device and simultaneously displaying an image photographed using a camera mounted on the rear surface of the external electronic device on the display of the electronic device mounted in a mounting recess formed in the rear surface of the external electronic device through a fastener.

18. The method of claim 11,
wherein the providing the dual display function comprises displaying, in response to a receipt of a selection of the dual display function, a body part to be recognized using a biometric sensor mounted on the rear surface of the external electronic device on at least one of the display of the electronic device and the display of the external electronic device, the display of the electronic device being mounted in a mounting recess formed in the rear surface of the external electronic device through a fastener.

19. An electronic device comprising:
a housing:
at least one fastener formed on at least one surface of the housing and configured to be attached to, and detached from, an external electronic device;
a communication circuit disposed inside the housing and configured to establish a communication connection with the external electronic device; and
a processor disposed inside the housing,
wherein the processor is configured to:
  detect whether the electronic device is connected with the external electronic device through the communication circuit; and
  provide a dual display function among at least one preset function of the connected external electronic device corresponding to the type of the electronic device, in response to the detection of the external electronic device connected with the electronic device.

20. The electronic device of claim 19, wherein the processor is configured to:
receive, from the connected external electronic device, a notification that the connected external electronic device has been set to perform the dual display function selected from the at least one preset function corresponding to the type of the electronic device;
generate a control signal corresponding to the dual display function to transmit the control signal to the connected external electronic device; and
allow the electronic device to provide the dual display function based on the transmitted control signal.

* * * * *